(12) United States Patent
Anderson et al.

(10) Patent No.: US 10,455,096 B2
(45) Date of Patent: Oct. 22, 2019

(54) DECORATING SYSTEM FOR EDIBLE PRODUCTS

(71) Applicant: DECOPAC, INC., Anoka, MN (US)

(72) Inventors: John R. Anderson, Lino Lakes, MN (US); Douglas A. Boysen, Saint Paul, MN (US); Carlos A. Davila, Maple Grove, MN (US)

(73) Assignee: DECOPAC, INC., Anoka, MN (US)

( * ) Notice: Subject to any disclaimer, the term of this patent is extended or adjusted under 35 U.S.C. 154(b) by 621 days.

(21) Appl. No.: 14/492,620

(22) Filed: Sep. 22, 2014

(65) Prior Publication Data
US 2015/0015919 A1    Jan. 15, 2015

Related U.S. Application Data

(63) Continuation-in-part of application No. 14/194,000, filed on Feb. 28, 2014, now Pat. No. 10,019,842, (Continued)

(51) Int. Cl.
*H04N 1/00* (2006.01)
*G06F 7/00* (2006.01)
(Continued)

(52) U.S. Cl.
CPC .......... *H04N 1/00188* (2013.01); *A23G 3/28* (2013.01); *A23P 20/15* (2016.08); *G06K 15/021* (2013.01);
(Continued)

(58) Field of Classification Search
CPC ......... G06F 17/30241; G06F 17/30371; G06F 3/0482; G06F 3/005; H04N 2201/0081; H04N 1/04; H04N 1/3935
(Continued)

(56) References Cited

U.S. PATENT DOCUMENTS 1,605,903 A   11/1926  Schuler
2,123,215 A    7/1938  Thomas
(Continued)

FOREIGN PATENT DOCUMENTS

GB        196885     3/1924
GB        422430     1/1935
(Continued)

OTHER PUBLICATIONS

U.S. Appl. No. 14/553,781, filed Nov. 25, 2014, Davila et al.
(Continued)

*Primary Examiner* — Hai Tao Sun
(74) *Attorney, Agent, or Firm* — Gardella Grace P.A.

(57) ABSTRACT

A device, method, and computer-readable medium for printing an image on an edible media. The method including receiving from an external device associated with a consumer the image, determining whether the image is of suitable quality to be printed on the edible media, transmitting a message to the external device, in response to a determination that the image is not of suitable quality to be printed on the edible media, and performing an image processing technique on the image to enhance the image for printing on the edible media, in response to a determination that the image is of suitable quality to be printed on the edible media. The method further including transmitting a request to a printer to print the enhanced image on the edible media, and transmitting a request to the printer to print a shipping label to ship the printed edible media to the consumer.

20 Claims, 28 Drawing Sheets

Related U.S. Application Data which is a continuation-in-part of application No. 12/852,988, filed on Aug. 9, 2010, now abandoned.

(51) Int. Cl.

| | | |
|---|---|---|
| *H04N 1/409* | (2006.01) | |
| *A23G 3/28* | (2006.01) | |
| *G06Q 30/06* | (2012.01) | |
| *G06K 15/02* | (2006.01) | |
| *G06T 7/00* | (2017.01) | |
| *A23P 20/15* | (2016.01) | |
| *G06Q 50/18* | (2012.01) | |
| *G06Q 50/00* | (2012.01) | |
| *A23P 20/25* | (2016.01) | |

(52) U.S. Cl.
CPC ....... *G06Q 30/0641* (2013.01); *G06T 7/0002* (2013.01); *H04N 1/0044* (2013.01); *H04N 1/00127* (2013.01); *H04N 1/00132* (2013.01); *H04N 1/00167* (2013.01); *H04N 1/00196* (2013.01); *H04N 1/00233* (2013.01); *H04N 1/4092* (2013.01); *A23P 2020/253* (2016.08); *G06Q 50/01* (2013.01); *G06Q 50/184* (2013.01); *G06T 2207/30168* (2013.01); *H04N 2201/0084* (2013.01); *H04N 2201/0091* (2013.01); *H04N 2201/0093* (2013.01)

(58) Field of Classification Search
USPC .......................................................... 345/633
See application file for complete search history.

(56) References Cited

U.S. PATENT DOCUMENTS

| | | |
|---|---|---|
| 2,347,022 A | 4/1944 | Austin |
| 2,353,594 A | 7/1944 | Seagren |
| 2,394,322 A | 2/1946 | McKee |
| 2,526,811 A | 10/1950 | Dawson |
| 2,578,150 A | 12/1951 | Rathke |
| 2,610,588 A | 9/1952 | Seagren et al. |
| 2,895,832 A | 7/1959 | Bersey |
| 3,057,730 A | 10/1962 | Morck |
| 3,192,086 A | 6/1965 | Gyurk |
| 3,649,347 A | 3/1972 | Battista |
| 3,654,894 A | 4/1972 | Rohrbacher et al. |
| 3,658,977 A | 4/1972 | Baker |
| 3,776,185 A | 12/1973 | Kawasaki |
| 3,852,494 A | 12/1974 | Williamson |
| 4,024,287 A | 5/1977 | Golchert |
| 4,061,783 A | 12/1977 | Hoffman et al. |
| 4,168,662 A | 9/1979 | Fell |
| 4,285,978 A | 8/1981 | Quinlivan |
| 4,292,917 A | 10/1981 | Ezaki |
| 4,388,862 A | 6/1983 | Thomas, Jr. |
| 4,409,893 A | 10/1983 | Newman et al. |
| 4,455,320 A | 6/1984 | Syrmis |
| 4,466,994 A | 8/1984 | Hubbard et al. |
| 4,531,292 A | 7/1985 | Pastemak |
| 4,537,647 A | 8/1985 | Foster |
| 4,548,825 A | 10/1985 | Voss et al. |
| 4,560,562 A | 12/1985 | Shroeder |
| 4,578,273 A | 3/1986 | Krubert |
| 4,592,916 A | 6/1986 | Akesson |
| 4,668,521 A | 5/1987 | Newsteder |
| 4,668,523 A | 5/1987 | Begleiter |
| 4,670,271 A | 6/1987 | Pastemak |
| 4,785,313 A | 11/1988 | Higuma et al. |
| 4,832,966 A | 5/1989 | Newsteder |
| 4,843,958 A | 7/1989 | Egosi |
| 4,910,661 A | 3/1990 | Barth et al. |
| 4,985,260 A | 1/1991 | Niaura et al. |
| 5,006,362 A | 4/1991 | Hilborn |
| 5,017,394 A | 5/1991 | Macpherson et al. |
| 5,032,416 A | 7/1991 | Niaura et al. |
| 5,035,907 A | 7/1991 | Phillips et al. |
| 5,081,917 A | 1/1992 | Masuda |
| 5,255,352 A | 10/1993 | Falk |
| 5,334,404 A | 8/1994 | Garcia et al. |
| 5,485,189 A | 1/1996 | Ebata |
| 5,505,775 A | 4/1996 | Kitos |
| 5,547,507 A | 8/1996 | Ciaramita |
| 5,555,350 A | 9/1996 | Strauss |
| 5,711,791 A | 1/1998 | Croker et al. |
| 5,795,395 A | 8/1998 | Ben-Matitayhu et al. |
| 5,834,047 A | 11/1998 | Ahn |
| 5,835,242 A | 11/1998 | Itoh |
| 5,862,326 A | 1/1999 | Bapat |
| 5,895,682 A | 4/1999 | Tsukioka |
| 6,045,220 A | 4/2000 | Kiyohara et al. |
| 6,058,843 A | 5/2000 | Young |
| 6,154,172 A | 11/2000 | Piccionelli et al. |
| 6,230,073 B1 | 5/2001 | Kofman et al. |
| 6,285,775 B1 | 9/2001 | Wu et al. |
| 6,536,345 B1 | 3/2003 | Young |
| 6,623,553 B2 | 9/2003 | Rossell et al. |
| 7,161,710 B1 | 1/2007 | MacLeod |
| 7,216,092 B1 | 5/2007 | Weber et al. |
| 7,286,258 B2 | 10/2007 | Schnoebelen et al. |
| 7,360,853 B2 | 4/2008 | Barss |
| 7,884,953 B1 | 2/2011 | Willcocks et al. |
| 8,172,099 B1 | 5/2012 | Hardy |
| 8,219,494 B1 | 7/2012 | Pride et al. |
| 8,543,463 B2 | 9/2013 | Zakas et al. |
| 8,944,542 B2 | 2/2015 | Nohilly et al. |
| 9,044,037 B2 | 6/2015 | Ream et al. |
| 2001/0012529 A1 | 8/2001 | Genevieve |
| 2002/0047867 A1 | 4/2002 | Mault et al. |
| 2002/0049638 A1 | 4/2002 | Ito |
| 2002/0095231 A1 | 7/2002 | Yu et al. |
| 2002/0109600 A1 | 8/2002 | Mault et al. |
| 2002/0152927 A1 | 10/2002 | Russell et al. |
| 2003/0007191 A1 | 1/2003 | Herbert |
| 2003/0077074 A1* | 4/2003 | Okamoto ............... G11B 19/06 386/252 |
| 2003/0198719 A1 | 10/2003 | Steward |
| 2004/0172149 A1 | 9/2004 | Eto |
| 2004/0267642 A1* | 12/2004 | Stenz ................... G06Q 10/087 705/28 |
| 2005/0088693 A1* | 4/2005 | Schnoebelen ............. B44C 5/00 358/1.18 |
| 2005/0254073 A1 | 11/2005 | Braun et al. |
| 2006/0155645 A1 | 7/2006 | Sainsbury-Carter et al. |
| 2006/0158685 A1* | 7/2006 | Spurgeon ............... A21C 14/00 358/1.15 |
| 2006/0279771 A1 | 12/2006 | Ludwig et al. |
| 2008/0144883 A1 | 6/2008 | Kacker et al. |
| 2008/0174676 A1 | 7/2008 | Squilla et al. |
| 2008/0209509 A1* | 8/2008 | Koike ..................... G06F 17/24 726/2 |
| 2008/0232686 A1 | 9/2008 | Ohashi |
| 2008/0309961 A1 | 12/2008 | Aichi et al. |
| 2008/0313011 A1 | 12/2008 | Rose et al. |
| 2008/0319870 A1* | 12/2008 | Ranjitkumar .......... G06Q 30/00 705/26.62 |
| 2009/0046308 A1 | 2/2009 | Ishizuka |
| 2009/0100013 A1* | 4/2009 | Fein .................. G06F 17/30867 |
| 2009/0244096 A1* | 10/2009 | Yamaji .................... G06T 11/00 345/630 |
| 2009/0285480 A1 | 11/2009 | Bennett et al. |
| 2009/0308931 A1 | 12/2009 | Halbur et al. |
| 2010/0017491 A1 | 1/2010 | Johns et al. |
| 2010/0185529 A1 | 7/2010 | Chesnut et al. |
| 2010/0199232 A1 | 8/2010 | Mistry et al. |
| 2010/0232716 A1* | 9/2010 | Sanders ............ A61F 13/15772 382/224 |
| 2010/0315491 A1 | 12/2010 | Carter et al. |
| 2011/0025735 A1 | 2/2011 | Nohilly et al. |
| 2011/0071894 A1 | 3/2011 | Nesamoney et al. |
| 2011/0090541 A1 | 4/2011 | Harper |
| 2011/0290694 A1 | 12/2011 | Fuisz et al. |

(56) References Cited

U.S. PATENT DOCUMENTS

| | | | |
|---|---|---|---|
| 2012/0020648 A1* | 1/2012 | Yamaji | G11B 27/034 386/278 |
| 2012/0064204 A1 | 3/2012 | Davila et al. | |
| 2014/0176608 A1 | 6/2014 | Boysen et al. | |

FOREIGN PATENT DOCUMENTS

| | | |
|---|---|---|
| GB | 543427 | 2/1942 |
| GB | 628886 | 9/1949 |
| GB | 786428 | 11/1957 |
| WO | 95/01735 | 1/1995 |
| WO | 97/27759 | 8/1997 |
| WO | WO 2004049809 A2 * 6/2004 ............. A21C 14/00 | |
| WO | WO 2015/003210 A1 | 1/2015 |

OTHER PUBLICATIONS

U.S. Appl. No. 14/553,884, filed Nov. 25, 2014, Davila, et al.
U.S. Appl. No. 14/492,620, filed Sep. 22, 2014, Anderson et al.
U.S. Appl. No. 14/569,042, filed Dec. 12, 2014, Davila, et al.
U.S. Appl. No. 14/569,224, filed Dec. 12, 2014, Davila, et al.
U.S. Appl. No. 14/569,290, filed Dec. 12, 2014, Davila, et al.
International Preliminary Report on Patentability and Written Opinion dated Feb. 12, 2013 in International Application No. PCT/US2011/047096, Filed Aug. 9, 2011.
Ferguson Plarre Bakehouses [Online], Retrieved from the Internet at https://www.fergusonplarre.com.au/designacake/on Aug. 3, 2010, 7 pages.
Genometri: Canval [Online], Retrieved from the Internet at http://www.genometri.com/canvas.htm on Aug. 4, 2010, 1 page.
International Search Report and Written Opinion dated Jan. 5, 2012 in Patent Application No. PCT/US11/47096 Filed Aug. 9, 2011.
Non-Final Office Action issued in U.S. Appl. No. 13/287,023 dated Feb. 27, 2015.
Final Office Action issued in U.S. Appl. No. 13/287,023 dated Jun. 3, 2015.
Non-Final Office Action issued in U.S. Appl. No. 13/287,023 dated Oct. 2, 2015.
Final Office Action issued in U.S. Appl. No. 13/287,023 dated Feb. 3, 2016.
Non-Final Office Action issued in U.S. Appl. No. 13/287,023 dated Aug. 31, 2016.
Non-Final Office Action issued in U.S. Appl. No. 14/553,884 dated Mar. 24, 2015.
Final Office Action issued in U.S. Appl. No. 14/553,884 dated Jul. 21, 2015.
Non-Final Office Action issued in U.S. Appl. No. 14/569,042 dated Mar. 27, 2015.
Final Office Action issued in U.S. Appl. No. 14/569,042 dated Jul. 21, 2015.
Non-Final Office Action issued in U.S. Appl. No. 14/569,224 dated Apr. 1, 2015.
Final Office Action issued in U.S. Appl. No. 14/569,224 dated Jul. 21, 2015.
Non-Final Office Action issued in U.S. Appl. No. 14/569,290 dated Mar. 27, 2015.
Final Office Action issued in U.S. Appl. No. 14/569,290 dated Jul. 16, 2015.
Non-Final Office Action issued in U.S. Appl. No. 14/569,290 dated Mar. 14, 2016.
Non-Final Office Action issued in U.S. Appl. No. 14/194,000 dated Oct. 25, 2016.
Final Office Action issued in U.S. Appl. No. 14/194,000 dated Mar. 14, 2017.
Non-Final Office Action issued in U.S. Appl. No. 14/194,000 dated Oct. 2, 2017.
Non-Final Office Action issued in U.S. Appl. No. 12/852,988 dated May 18, 2012.
Final Office Action issued in U.S. Appl. No. 12/852,988 dated Feb. 14, 2013.
Non-Final Office Action issued in U.S. Appl. No. 12/852,988 dated Dec. 11, 2014.
Final Office Action issued in U.S. Appl. No. 12/852,988 dated Jun. 24, 2015.
Non-Final Office Action issued in U.S. Application No. 121852,988 dated Jun. 2, 2016.
Non-Final Office Action issued in U.S. Appl. No. 14/528,770 dated Dec. 6, 2017.
Final Office Action issued in U.S. Appl. No. 14/528,770 dated Apr. 23, 2018.
Non-Final Office Action issued in U.S. Appl. No. 14/553,781 dated Mar. 24, 2015.
Final Office Action issued in U.S. Appl. No. 14/553,781 dated Jul. 20, 2015.

* cited by examiner

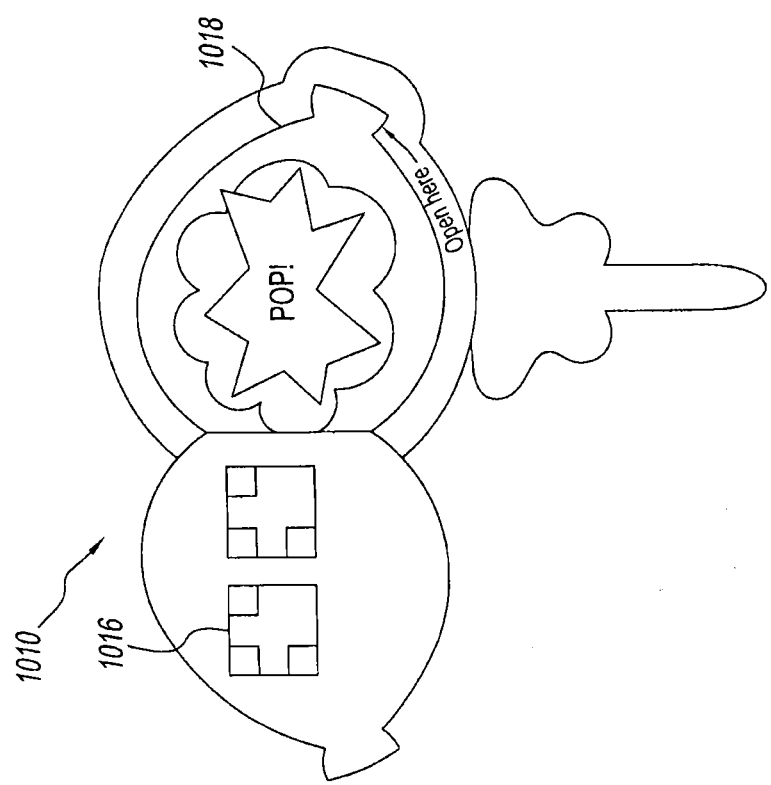

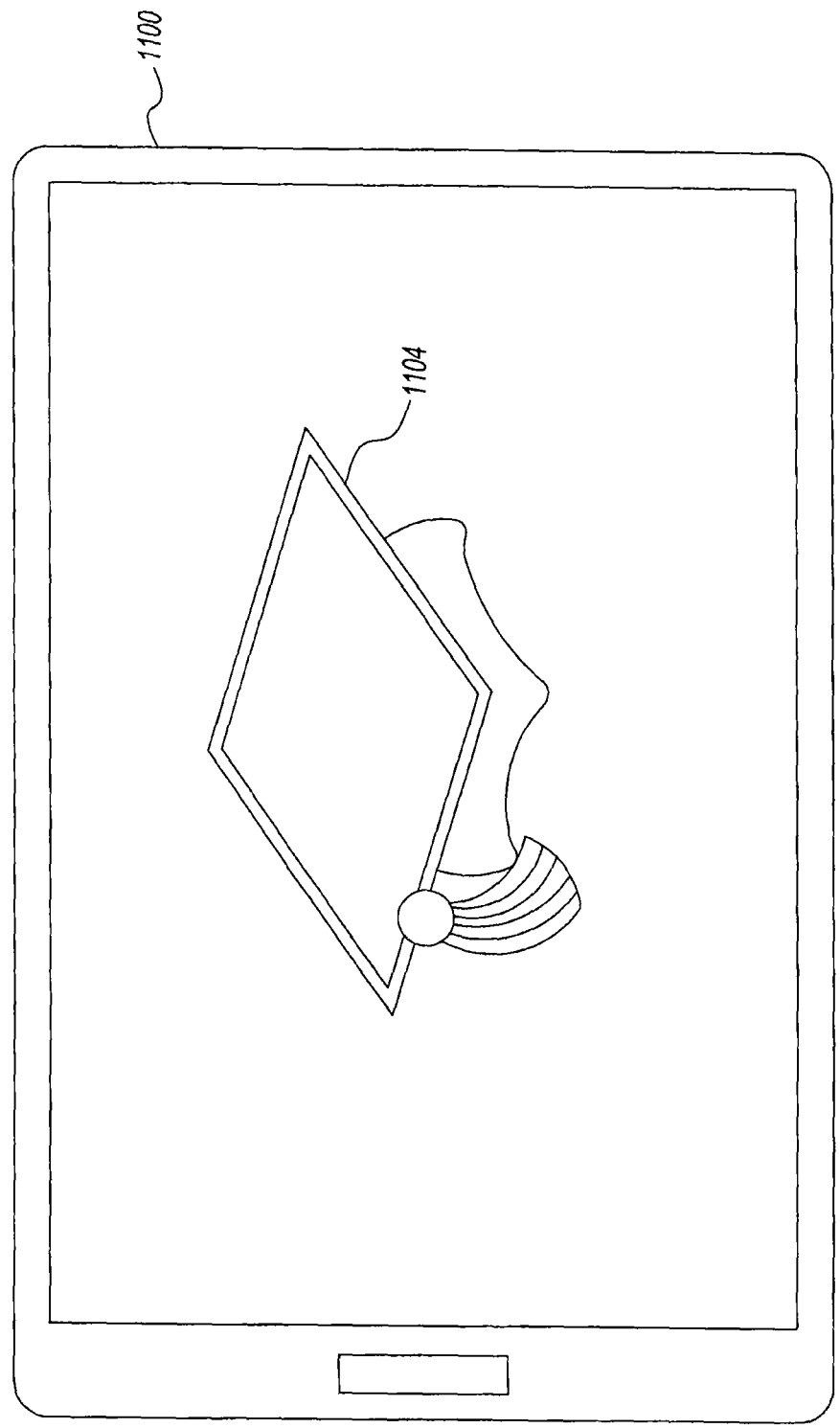

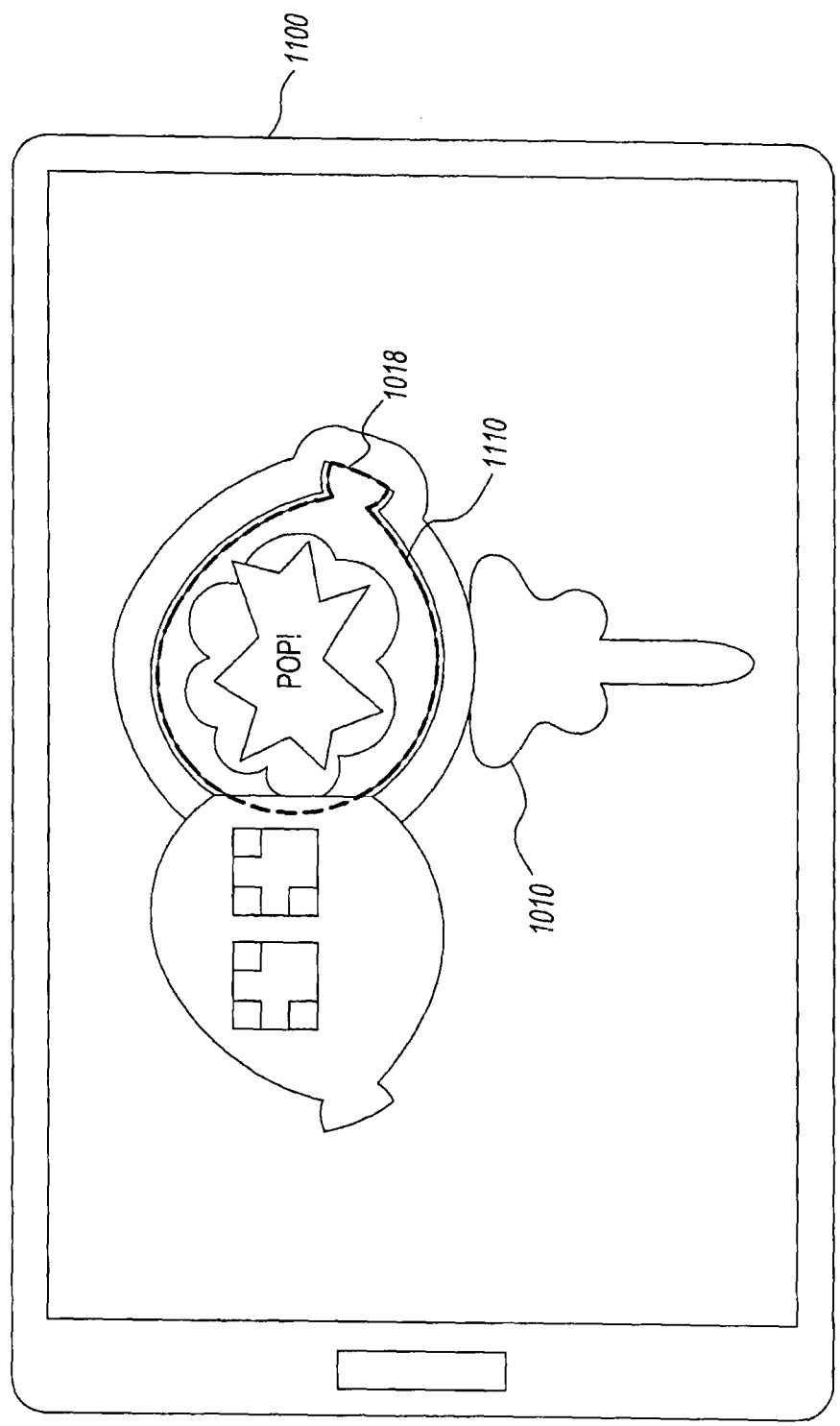

DECORATING SYSTEM FOR EDIBLE PRODUCTS

CROSS-REFERENCE TO RELATED APPLICATIONS

This application is a continuation-in-part of and claims priority to U.S. application Ser. No. 14/194,000, filed on Feb. 28, 2014, which is a continuation-in-part of and claims priority to U.S. application Ser. No. 12/852,988, filed on Aug. 9, 2010, the entire content of each of which is incorporated in the present document by reference.

BACKGROUND

Decorated food products, such as cakes, are popular items, particularly for special occasions, such as birthdays, holidays, weddings, anniversaries and other celebratory events. These items are typically purchased from bakeries since the items generally require some skill and/or apparatus to create. Currently, these items are created from colored frostings applied manually by trained bakery chefs. In addition, pre-made decorative items may be placed on a food product. These pre-made items are generally produced in bulk in a factory and inventoried until use. The use of such pre-made decorative items precludes uniquely decorated and/or personalized decorations. Also, these pre-made decorative items are generally pre-ordered, which requires a long lead time, or stored in inventory at the risk of under-ordering or over-ordering, as well as the cost of such inventory.

Another alternative has been to utilize an automated system for decorating cakes. One such system is disclosed in U.S. Pat. No. 5,505,775, issued to Kitos. This system utilizes an integrated work surface controlled with a computer system. An image is scanned into the computer system. The computer system then uses a motion control system to manipulate a drop on demand colorant expulsion system over a cake carried on the work surface to reproduce the scanned image. This system produces the decorations and images directly onto the food product.

An automated system for printing images onto edible media, that can then be applied to a food product or consumed as is, is disclosed in U.S. Pat. No. 7,286,258, issued to Schnoebeien et al. This system discloses a local processing unit and a number of image sources, including a scanner and a database of digital images stored on a local computer memory system. The user selects an image from one of the image sources and prints the image onto an edible media.

Various websites exist for allowing users to customize decorations. One such online website is www.genometri-.com which allows users to decorate and purchase customized decorated cakes. Users can choose from pre-designed decorative templates or can choose to customize their cake decoration. Users can upload personal photographs to use in the cake decoration and can add text and clip art to the cake decoration. When the user is finished decorating the cake, the user purchases a cake decorated with the customized decoration. The purchase transaction is processed through the website.

SUMMARY

Disclosed herein are a computing device, a method, and a computer-readable storage medium for printing an image on an edible media. The method includes receiving from an external device associated with a consumer the image, the image being captured by or stored at the external device, and the external device being located at a different geographical location from the computing device, determining whether the image is of suitable quality to be printed on the edible media, transmitting a message to the external device, in response to a determination that the image is not of suitable quality to be printed on the edible media, and performing an image processing technique on the image to enhance the image for printing on the edible media, in response to a determination that the image is of suitable quality to be printed on the edible media.

The method further includes transmitting a request to a printer to print the enhanced image on the edible media using edible inks, transmitting a request to the printer to print a shipping label to ship the printed edible media to the consumer such that the consumer can use the printed edible media to decorate an edible product, and transmitting a confirmation to the external device indicating that the printed edible media is ready for shipment to the consumer.

The details of one or more implementations are set forth in the accompanying drawings and description below. Other features, objects, and advantages will be apparent from the description and drawings, and from the claims.

DESCRIPTION OF DRAWINGS

FIGS. 10A-10F depict example pics with an augmented reality marker.

FIGS. 11A-11G depict example augmented reality content.

DETAILED DESCRIPTION OF ILLUSTRATIVE EMBODIMENTS

As used herein, an edible media refers to a substrate upon which an image will be printed, and a printed edible media refers to a finished product (i.e., an image printed on the edible media).

Figure 1:
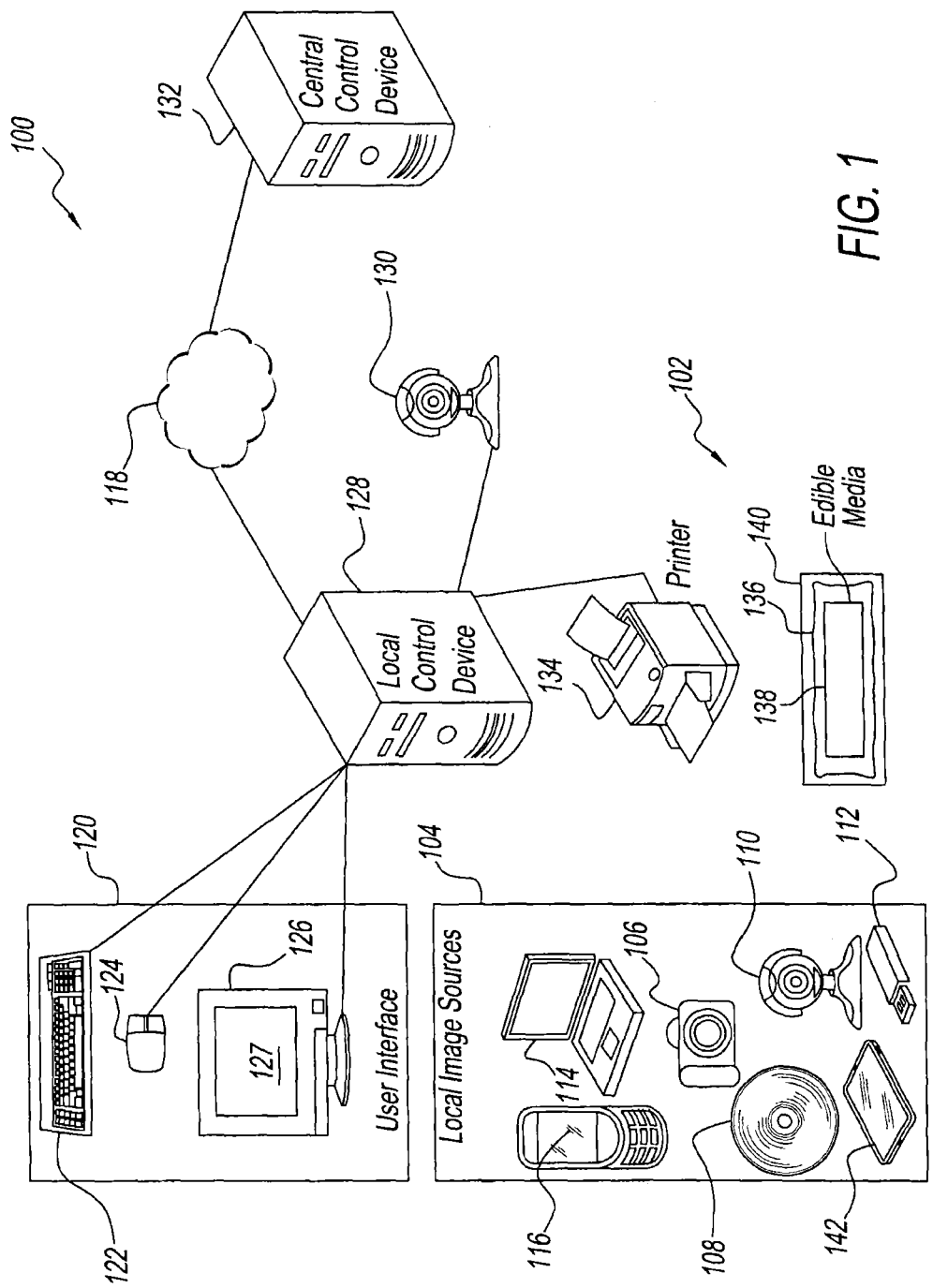
FIG. 1 is an example system for decorating edible media.

FIG. 1 is an example system 100 for decorating an edible media 102. The system 100 provides an online environment for decorating edible media. The online environment includes one or more website applications with which the user can interact to print edible content on edible substrates or edible media. The system 100 provides a mechanism to perform online or local searching of images and customization of images. The system 100 is operated by a user to print and/or customize images including both licensed and non-licensed digital images. The system 100 additionally provides digital rights management, print monitoring functions, user account management, and messaging functions.

The system 100 manages both licensed and non-licensed images for purposes of obeying licensing laws when printing the images on an edible medium. Licensed digital images, such as copyrighted images including logos, characters, illustrations, or photographs having licensing terms and conditions for usage can be purchased from one or more online sources. Non-licensed digital images such as personal photographs, illustrations, clip art, or other non-copyright protected images can be uploaded locally to the system 100. Both licensed and non-licensed digital images are retrieved from an external device or the Internet, stored locally, and uploaded to the system 100. In some embodiments, a combination of licensed and non-licensed digital images are retrieved either locally or online and printed in combination on a single edible medium. In some embodiments, the digital images are uploaded by the user to a web server (i.e. the cloud) that runs programs, such as an anti-virus program or metadata scrubber, to clean the image. The image is then downloaded by or pushed to the local control device 128 for printing via printer 134.

Users generally access the online environment in system 100 to search, select, edit, and purchase images. The purchased images can be printed onto the edible media 102 using edible inks. For example, a user of system 100 accesses the online environment to search for a particular image. The user selects the image, purchases and/or edits the image, and directs the system 100 to print the purchased image onto the edible media 102. The images available to system 100 can be retrieved from any number of sources including local, online, or remote storage repositories. For example, images can be retrieved from local image sources 104 which are communicably connectable to system 100. The local sources can include, but are not limited to a digital camera 106, a CD-ROM OR DVD 108, a video device 110, a flash drive 112, a scanner 114, a mobile telephone device 116, a tablet 142, an external hard drive, a netbook, a laptop, a wireless device (e.g., Wi-Fi enabled, Bluetooth enabled, or other wirelessly enabled device), or a handheld device (not shown).

Images can also be retrieved via the Internet 118 from any number of websites containing digital images or libraries of digital images. Images can additionally be retrieved from other networked or remote storage repositories (not shown). Upon retrieving images, the system 100 provides access to additional features for handling retrieved images, such as photograph editing, social networking content insertion, or augmented reality content insertion.

Users can purchase printed edible media using one or more e-commerce sites. For example, users can purchase an edible sheet from an e-commerce site incorporated into system 100. E-commerce sites associated with system 100, for example, provide a number of selectable options for obtaining printed edible media. The user can choose standard "off-the-shelf" printed edible media items or custom printed edible media items.

In some embodiments, the user is provided the option to purchase printed edible media locally using the system 100. For example, the user may be offered several sizes of edible media for decorating. The user can select a desired decoration size and choose an edible media (e.g., an edible sheet of paper) size compatible with the desired decoration size. The selected edible media (e.g., edible media 102) can be purchased through the system 100 by entering an appropriate image code or by simply selecting the desired image onscreen. The image code can, in effect, function as a part number for ordering a specific printed edible media sheet size. In some embodiments, the image code is requested by the system 100 to prompt a user to select a printed edible medium available locally in a bakery, for example. The selected edible media can be loaded into the system 100 and images can be printed upon the edible medium items, for example, edible media with preprinted backgrounds onto which additional images may be printed using the system 100.

In certain embodiments, the system 100 requests that the user enter a unique code. The unique code may be sent to the user with edible media prior to accessing system 100. The unique code can be entered once by the user to enable printing of images a specific number of times. For example, the user can enter a code and receive up to twenty-four print sessions for selected images. In operation, once the user enters the code, the system verifies that the code is valid and has not been used before. The central control device performs color correction on the digital data from the image source and sends the digital data to the local control device. The local control device converts this processed data into printer control signals. These signals operate the printer to transport the edible media along the printer media path and adjacent the printheads of the printer. The printer prints a rendition of the image onto the edible media with edible inks.

Once the edible media has traveled through the printer and the image printed thereon with the edible inks, the printed edible media is removed from the printer. The printed edible media may then be placed on a food product for decorating (e.g., cake or cupcakes), either at the point of printing or transported to a separate location for application. In some embodiments, the edible media is sturdy allowing for convenient transport and thus minimization of damage to the decorations. In other embodiments, the edible media may be relatively thin and require additional protective packaging for transport.

In some embodiments, the system 100 includes an image uploading device. The image uploading device may be a wired or wireless storage device operable to upload licensed and non-licensed digital images. The image uploading device may be coupled to any number of alternate image sources for uploading additional images. For example, the image uploading device may represent a scanner, while the alternate image source represents a network drive accessed over the Internet. In another example, the image uploading device represents a mobile phone device while the alternate image source represents a USB fob.

In some embodiments, elements of the system 100, including one or more of the user interface, local image sources, and the local control device are located in a retail location, such as a bakery. In such case, the user may be an employee or a customer of the bakery.

In some embodiments, elements of the system 100, including one or more of the user interface, local image sources, and the local control device are in possession of or accessed directly by the consumer, independent of a retail location. For example, the user is a consumer and the consumer uses his or her tablet or smartphone as the user interface and/or local image source.

User Interface

In the system 100, user interface controls 120 are connected to the local control device 128. The user interface controls 120 may include any or all devices such as a keyboard 122, a mouse 124, and a display device 126. Other embodiments may use other devices, such as a touch screen device, a joy stick, or a voice command system. The user interface controls 120 allow the user to operate the system 100 to decorate edible media 102 or to display edible media-related content on the display device 126.

The user is displayed a variety of navigation screens and menus on the display device 126. The user selects desired options from the navigation screens and menus using the keyboard 122, the mouse 124, or other input mechanism. The user interface controls 120 relay signals from the user to a local control device 128, thereby operating the system 100.

The display device 126 is operable to display a graphical user interface GUI 127 for interacting with the hardware and software components of system 100. The GUI 127 can, for example, include application screens, website content, software controls, and other graphical user interface content. The GUI 127 is operable to receive user input for accessing one or more licensed or non-licensed digital images. The GUI 127 can, for example, include graphical elements provided in one or more applications. Users can interact with one or more graphical elements to control the behavior and output of system 100 components.

The GUI 127 is operable to control the local control device 128 and communicate with the central control device 132 over a network to retrieve at least one licensed digital image from the central control device. The GUI 127 is also operable to cause to be printed at least one licensed digital image onto an edible medium. In some embodiments, the GUI 127 is operable to retrieve non-licensed images.

Local Image Sources

The system 100 includes one or more devices which can be communicably coupled to system 100 as local image sources 104. In this example, a variety of local image sources 104 are connected to the local control device 128. One such local image source 104 is the scanner 114. The scanner 114 can be a flatbed scanner, or any other type of scanner such as a drum scanner or a through feed scanner. The scanner 114 allows an image to be rendered from personal photographs, drawings, books, magazines, etc.

Other local image sources 104 include the digital camera 106, the CD ROM OR DVD 108, the video device 110, the flash drive 112, the mobile device 116, and the tablet 142; however, other sources of digital image storage or repositories can be used in the system 100. In operation, when a particular local image source is connected to the local control device 128, a user can retrieve images from the connected local image source to use in the system 100 for decorating (e.g., printing on) the edible media 102.

Images retrieved from local image sources are uploaded to system 100 and stored. For example, scanned images retrieved from scanner 114 are uploaded into system 100, stored locally on system 100 and provided for use in the system. The stored images can be retrieved by users for editing, printing, and so on.

Local Video Device

The system 100 may include one or more local video devices 130. Any device that is capable of capturing and communicating a digital video signal can be used. In certain embodiments, the local video device 130 is a web camera. The local video device 130 is generally connected to the local control device 128 by a wireless or wireline means. The user uses the local video device 130 to send a digital video signal to the local control device 128. The local control device 128 may transmit the digital video signal to a central control device 132 via the network 118 for later access and use.

Local Control Device

The local control device 128, in this example, is coupled to the user interface controls 120, the local image sources 104, the local video device 130, and a printing device 134. The local control device 128 may be coupled to at least one local image source containing at least one local digital image. In some embodiments, the desired image(s) may be retrieved from the central control device 132 for use in the local control device 128, including printing onto the edible medium.

The local control device 128 is operated by the user using the user interface controls 120. For example, the user operates the local control device 128 to search, select, and purchase an image. The local control device 128 is operable to print the purchased image onto the edible media 102, for example. In some embodiments, the local control device 128 may include a software web browser that allows the local control device 128 to communicate with the central control device 132 via network 118. In some embodiments, the central control device 132 is a web server capable of communicating using standard Internet protocols.

In this example, the local control device 128 is depicted as a computer system. Additionally exemplary embodiments of the local control device can include a tablet, smartphone, or other mobile device. However, any processing device which can digitally process signals from local image sources 104 or other sources can be used.

In some embodiments, the local control device is coupled to a printer and an image uploading device for purposes of retrieving and transmitting a digital image from the image uploading device to the printer. The retrieval and transmission is typically in response to the user selection. For example, the user uses a scanner to upload an image to the local control device. The uploaded image is transferred to the printer for printing onto the edible media.

Central Control Device

The central control device 132 is connected via the network 118 to the local control device 128. The central control device 132 includes a plurality of digital images, both licensed and non-licensed for decorating edible media by authorized users. The digital images are protected from unauthorized usage and unauthorized user access. The central control device 132 provides a tracking mechanism to authorize or de-authorize usage of digital images. For example, the central control device 132 authorizes the use of particular digital images according to user credentials. The user credentials can be stored in system 100, or externally. The user credentials typically include payment information, location information, and system usage data. The central control device 132 verifies whether specific users should be provided access to particular images.

The central control device 132 may include a software web server which allows the local control device 128 to communicate with a website on the central control device 132. The web server can be any web server capable of communicating using standard network protocols compatible with local control device 128 using a variety of Internet connection types and operating systems. The web server may run on a variety of operating platforms, for example Windows, Linux, MAC OS, or UNIX.

The website (not shown) hosted on the central control device 132 includes a number of software modules. The software modules include image library modules, user account modules, edible media modules, photograph editing modules, user location recognition modules, training modules, print modules, licensing restriction modules, social networking modules, augmented reality content modules, and/or messaging modules. Other modules are possible.

The user can access the website and accompanying software modules on the central control device 132 using the local control device 128, for example. The user can search images, purchase images, edit images, print images, order edible media, view training content, and access social networking features and augmented reality content stored on the central control device 132. Example software modules will be discussed below in reference to FIG. 2.

Printing Device

The system 100 includes the printing device 134 operable to receive and print images upon edible media 102 using edible inks. The printer 134 may include a feed path through which the edible media 102 is inserted and conveyed past one or more printheads. The printhead technology can be any type of printhead technology which can be controlled by digital signals and can accommodate edible printing media (e.g., edible inks) including, for example, inkjet, thermal inkjet, piezo inkjet, continuous inkjet, valve jet, electrostatic inkjet, and airbrush technology. As printing technology evolves, other printing technologies may additionally be incorporated into the system.

In some printing systems, the edible inks described above are generally fed from a cartridge reservoir. Such cartridge reservoirs may be refilled as need. In some embodiments, images are printed onto a transfer layer, which in turn is applied onto the edible media 102. In other embodiments, the images are printed directly onto the edible layer 136.

Edible Media

The system 100 includes edible media 102 on which images are printed. The edible media 102, in this example, includes at least one edible layer 136 and an edible coating 138. The edible medium may be a single layer of edible paper. For example, the edible medium may be a single layer of sugar paper, sugar paste, starch paper, fondant, or some other edible form.

In some embodiments, the edible coating 138 enables the edible media 102 to render a high quality pictorial image on the surface of the edible layer 136. Without this coating 138, the inks tend to run or bead or form an imperfect image. In one example, the coating 138 is a very thin layer of calcium carbonate. This thin layer allows the inks to properly perform to render a high-quality pictorial image. Other coatings may be used in system 100.

One embodiment of the edible layer 136 of the edible media 102 includes a mixture of a sugar paste of varying thickness. The edible layer 136 is typically formulated for several key features. First, the edible layer 136 is formulated to depict high quality pictorial images from particular edible inks disclosed herein. Second, the edible layer 136 travels through a printer (e.g., printer 134) without damaging the edible media 102, the edible layer 136, or the printer. For example, the edible layer 136 is formulated and manufactured to ensure sufficient strength and flexibility to be bent and manipulated through the conveying path of the printer 134, withstand the heat of the printing process, and still maintain suitable thickness as to not jam in the printer mechanism of printer 134. Third, the edible layer 136 is formulated to ensure there is no detraction from the taste of the food product on which it is to be applied. In some embodiments, the edible layer 136 is formed from sugar, sorbitol, hydrogenated palm kernel oil, xanthan gum, locust bean gum, gum tragacanth, dried glucose syrup, glaze, and water. Other variations of edible layers and edible media may be used as well.

In some embodiments, the edible layer 136 is formulated for use in decorating pizza or deli type items. For example, the edible layer 136 may be formed from tapioca starch, corn starch, corn syrup, microcrystalline cellulose, sugar, water, canola oil, gylcerine, titanium oxide, polyglycerol esters, salt, maltodextrin, silicon diokide, medium chain triglycerides, algin, citric acid, coconut oil, soy lecithin, locust bean gum, FD&C blue #1 lake, red #40 lake, yellow #5 lake, and yellow #6 lake.

Other examples of edible layers 136 are described in U.S. Pat. No. 5,017,394, assigned to the Lucks Company, and incorporated herein by reference. This type of edible layer 136 is formed from a flour and/or starch base as opposed to the sugar base of a fondant. Another example of an edible layer 136 is disclosed in U.S. Pat. No. 5,334,404, issued to Garcia et al, and incorporated herein by reference. Other types of edible layers 136 can be used including, but not limited to rice paper, wafer paper, and other edible substrates on which an image may be printed.

In some embodiments, the edible media 102 may also include a release sheet 140 having a silicon coating functioning as a backing material, for example. In some embodiments, the edible media 102 is a standard size or shape. Example sizes can include 8.5 inches by 11 inches, 9-inch round, and 8-inch round. The size can be a precut size or a selectable size. In some embodiments, frosting layers, edible paper and/or fondant layers can be malleable and/or stretchable to various sizes and shapes.

Edible Inks

The edible inks used in the system 100 are typically formulated from food grade colors to enable high quality, near-photographic images to be printed onto the edible media 102. These inks are edible and have precise color-matching properties, but additionally function in a manner similar to other commercially available inks in printers. Edible inks may include natural inks manufactured from a food grade base.

The edible inks are specifically formulated for use in a particular printer. The user selects to print the image using different color models, according to the requirements of the printer. Providing selectable color models improves the precision of the printed image by enabling adherence to particular color matching systems. The edible inks may be inks designed to be used for decorating numerous different types of food products, including, for example, cookies, cakes, pizza, cupcakes, candy bars, edible tattoos, temporary tattoos, cereal boxes, waffles, and pancakes.

The edible inks are additionally formulated to faithfully render images in accordance with the appropriate color model. Possible color models include, but are not limited to, the Cyan, Magenta, Yellow and Black (CMYK) color model, as well as the RGB, LAB, HSB, Panatone, Hexachrome, and other color models. In some embodiments, the edible inks are formulated to render images in accordance with the CMYK color model. In some examples, the compositions of the edible inks could include (1) Cyan: water, sodium lauryl sulphate, FD&C Blue #1 (2) Magenta: water, sodium lauryl Sulphate, FD&C Red #3 & FD&C Blue #1 (3) Yellow: water, sodium lauryl sulphate, FD&C Yellow #5, and/or (4) Black: water, sodium lauryl sulphate, FD&C Blue #1. Other examples of edible inks that provide faithful matching to the CMYK color model, as well as other color models, and that function within the constraints of commercially available printing technologies may be used in the system 100. In some embodiments, the inks used in system 100 include a combination of edible inks, natural inks, synthetic inks, or other inks.

Example User Interface Functionality

Any number of user interface elements can be provided to a user of system 100. The user interface elements may include multiple screens presented as web pages. As is typical, the GUI 127 in system 100 provides a home screen and various other screens available for user navigation. One example home screen may include user-selectable controls to perform a quick copy of an image, upload or print a photograph, select options such as frames or artwork, generate an order, create a design, and modify system settings.

The quick copy control can be selected by a user to initiate a scanner for uploading an image and quickly copying the image to a system repository. The quick copy control can provide instructions onscreen to the user for accomplishing the quick copy. The instructions may include text, graphics, and/or video content. The instructions can be provided in a user-selectable language.

The upload or print a photograph control can be selected to upload and print a photograph. The photograph control can instruct a user to identify a media source (e.g., scanner, CD, USB, Flash card, web camera, etc.). The photograph control can request that the user verify media settings and upon verification, the control can upload the photograph. The user can choose to edit the uploaded photograph and print the uploaded photograph with applied editing.

Options such as selecting frames or artwork are selected by the user to invoke the system to configure frames and/or artwork for printing. The configuration options can, for example, include verifying original media settings, and selecting a frame or artwork item. The system 100 can retrieve the frame and/or artwork and allow the user to perform edits. The users can additionally select a particular edible media (e.g., topping) before printing the frame and/or artwork on the edible media.

The order form control can be used to generate an order. For example, users can choose to generate and complete a number of standard order forms. Example order forms include a licensed artwork order form, a licensed frames order form, a general order form, a customer cake order form, and a customer deli order form. In some embodiments, users can print an order form and manually request an edible media print or product.

Other controls can be provided to present other information about the system 100 and or inventory available to the system 100. For example, controls can be provided to present inventory management items such as quarterly purchase reports, complete purchase history reports, on-hand inventory reports, and the like.

Another example control can include options or screens for modifying system settings including default color and default fonts. Users may also wish to customize a user account associated with the websites hosted on system 100. For example, a user may wish to change a color scheme or font size when logging into one or more websites hosted on system 100.

Another example control can provide maintenance checklists and tasks for an administrative user. The maintenance controls may only be visible to the administrative user upon login. Other standard system users may not view or access the maintenance controls and/or menus.

In some embodiments, the user interface can provide links to copyright release forms, copyright statement forms or other legal documents. Users can choose to preview and/or print the legal documents on demand.

Software Modules

Figure 2:
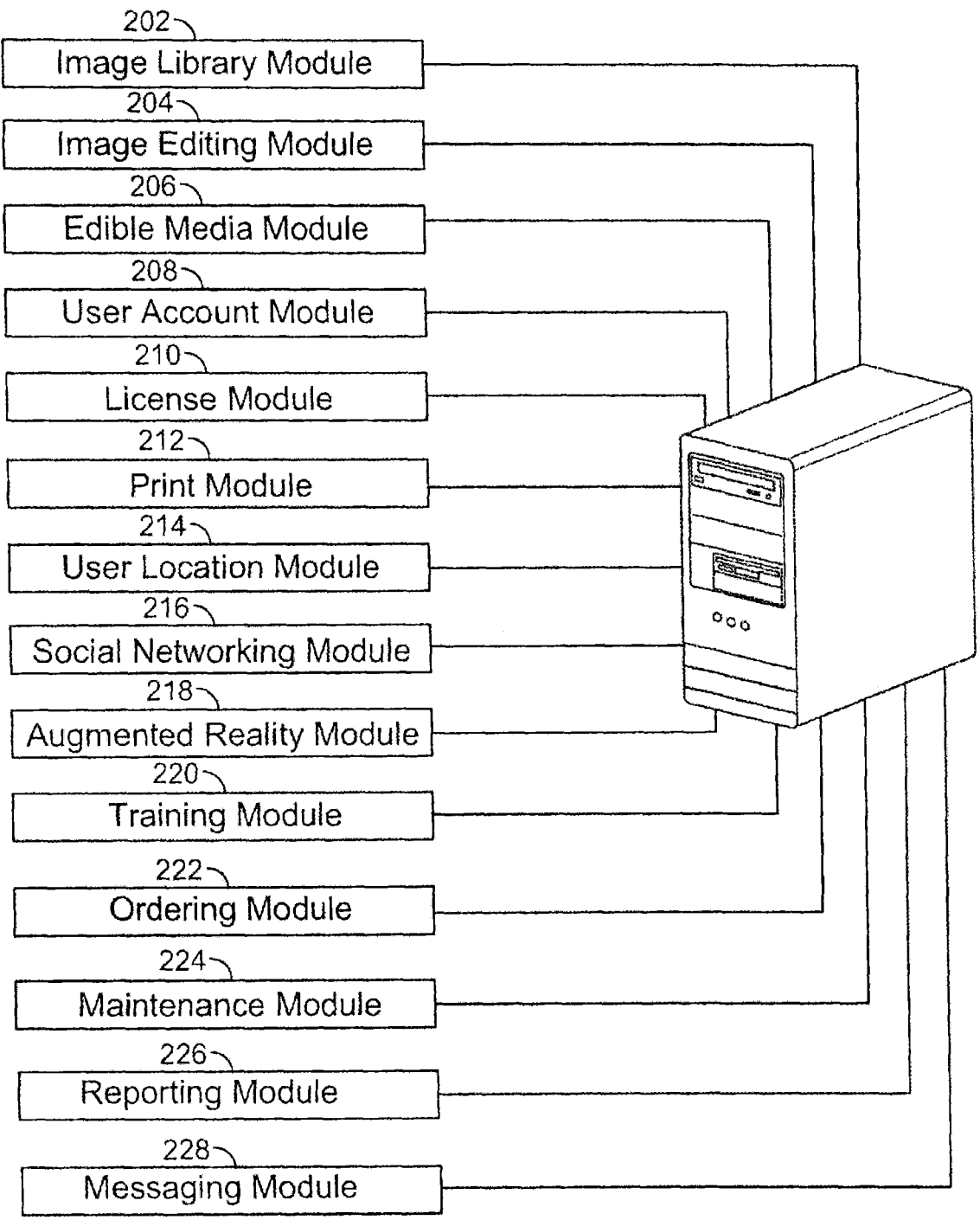
FIG. 2 is an example computer system containing software modules of a website used in a system for decorating edible media.

FIG. 2 is an example computer system 200 containing software modules of a website used in a system for decorating edible media. The system 200 can, for example, be analogous to central control device 132 (FIG. 1) or, in some embodiments, may be loaded onto the local control device 128. A user of the system 200 accesses a website on the central control device 132 to gain access to one or more software modules 202-226.

The software modules shown in FIG. 2 include an image library module 202, an image editing module 204, an edible media module 206, a user account module 208, a license module 210, a print module 212, a user location module 214, a social networking module 216, an augmented reality module 218, a training module 220, an ordering module 222, a maintenance module 224, a reporting module 226, and a messaging module 228. When executed on a device (for example, the central control device 132 or the local control device 128), each of the modules 202-228 causes the device to perform the functionality described below.

The image library module 202 is a software module including a plurality of digital images that can be printed onto an edible media. The module 202 includes both images available for purchase and free images. The images may be licensed or unlicensed images, and may include clip art, illustrations, photographs, text, or other file content. The image library module 202 generally contains different formats of the same image each of which are configured for printers that use differing color models.

The images in the image library module 202 may contain embedded augmented reality markers, which allow the user access to augmented reality content. The augmented reality marker can be any asymmetric geometric shapes of any color with sufficient contrast or other shapes and colors that provide a uniquely recognizable marker. The user can use the image containing the augmented reality marker to access augmented reality content on the augmented reality module 218, for example.

The image library module 202 allows the user to browse or search through the images using keyword criteria such as "Sports" or "Princess" or "Birthday." The image library 202 may be updated with new images and new image formats at any time.

The image library module 202 interacts with the license module 210 and the user location module 214 to allow or restrict users when finding and/or purchasing particular images. For example, the license module 210 may restrict access to a user based on a number of factors. One example factor may include barring image purchases based on a geographic location of the user. In this example, when a user selects to view images available from the image library module 202, the user location module 214 can automatically identify the geographic location of the user. The user's geographic location can then be used by the license module 210 to identify whether any of the images in the image library module 202 are restricted from being sold in the user's location. If a restriction is found, the license module 210 sends to the image library module 202 information on which images are unavailable to the user. The image library module 202 removes the restricted or unavailable images from the image library made available to the user. For example, if the user's geographic location is in Canada and certain images in the image library module 202 are restricted from being sold in Canada, then the license module 210 sends to the image library module 202 information on which images are unavailable to the user and the image library module 202 removes the restricted or unavailable images from the image library made available to the user.

The image library module 202 also interacts with the user account module 208 to allow a secondary user to only search and purchase images that have been authorized for the secondary user by a principal user. For example, a principal user can designate specific secondary users. The principal user then searches through the image library module 202 and identifies which images can be sold to which secondary users. The principal user can designate different images for users in different geographic locations. When a secondary user accesses the website and selects to search the images in the image library module 202, the secondary user is only shown the images that have been previously authorized by the principal user.

The image library module 202 also interacts with the social networking module 216 to allow the user to identify the most popular images or designs and to access other social networking functions. For example, the user may be provided an option of viewing lists of the most popular designs. The user may also be provided an option of viewing consumer reviews of images in the image library. The provision of social networking options may be provided in an online fashion where the user can interact with social networking content using system 100.

The image library module 202 interacts with the print module 212 to ensure that the version of the image that is compatible with the color model of the printer is sent to the user's printer. When the user selects to print an image, the print module 212 sends to the image library module 202 the color model of the user's printer. The library module 202 sends to the user's printer the correct format of the image.

The image library module 202 also interacts with the edible media module 206 to enable the user to identify images suitable for the particular edible media selected for decoration. The user enters into the edible media module 206 the specific type of edible media being decorated. The edible media module 206 contains characteristics of the edible media, and sends to the image library module 202 specific criteria for compatible images, such as image size. The image library module 202 removes the images which are not compatible with the edible media the user selected.

The edible media module 206 is a software module that includes a list of the edible media available to be used in the system 100 and which are available for purchase by the user. The user can search or browse through the edible media module 206 using various keyword criteria, such as "cupcakes" or "cake." The edible media module 206 may also contain information about the cost and availability of edible media. Furthermore, the edible media module 206 also may contain a database of unique codes that are associated with particular edible media. The unique codes may function as part numbers, printing data, cost data, retrieval data, or other data. The edible media module 206 interacts with the user account module 208 to allow the user to purchase edible media. Once the user selects an edible media for purchase, the user account module 208 processes the financial transaction. In some embodiments, if a licensed image is selected, the user account module 208 may require the user to checkout before proceeding to print the image on the edible media.

The edible media module 206 interacts with the image library module 202 to allow the user to identify images that are compatible with particular edible media. The edible media module 206 contains information about edible media compatible with the system. The user chooses the specific type of edible media and the edible media module 206 sends information about this edible media to the image library module 202. The image library module 202 then isolates specific images that are compatible with the particular type of edible media.

The edible media module 206 includes at least one repository (not shown) of unique codes that are associated with particular edible media. The edible media module 206 tracks whether or not a code has been used to authorize a print. The edible media module 206 interacts with the print module 212 to verify that the user is using authorized edible media using the codes. The print module 212 notifies the edible media module 206 upon receiving a purchase request, which prompts the user to enter the code from the edible media. The edible media module 206 verifies that the code is valid and that the code has not been previously used. If the code is valid, then the print module 212 proceeds with the print of the image. If the code is not valid, then the print module 212 notifies the user of the invalidity without printing the image.

The image editing module 204 is a software module that allows users to edit selected images. Example editing functions may include cropping, moving, rotating, re-touching, brightening, darkening, and adding text to images, as well as other image editing operations. The image editing module 204 interacts with the licensing module 210 to prevent users from editing images on which there are editing restrictions imposed by a license. The license module 210 informs the image editing module 202 if there are any restrictions on editing the selected image, and if so, what the restrictions are. The image editing module 204 then prevents the user from editing any images in violation of a license.

The user account module 208 is a software module that maintains profiles of individual users in user accounts. The user accounts include information pertaining to a number of users, such as address data, financial data, previous image usage, etc. In some embodiments, the user account module 208 maintains a list of user names and passwords that provide or limit access to particular user accounts. The user account module 208 can process financial transactions, for example, to allow users to purchase edible media.

The user account module 208 can store purchase and order histories including selected images, designs, text content printed, notifications configured, edible media purchased, etc. The user account module 208 can also store user profiles, address data, financial data, and image restrictions.

The user account module 208 interacts with the edible media module 206 to allow the user to purchase edible media. Once the user selects the desired edible media, the user selects to purchase the edible media. The user account module 208 will then process the purchase. The user account module 208 may prompt the user for credit card information or bank account information for direct debit. Alternatively, the user account 208 may already have this information on file. The user account module 208 will charge the user the designated amount.

In some embodiments, the user account module 208 provides an option to purchase credits. The credits can be applied to a particular user account for purposes of purchasing images using the credits. The credits can be incremented when purchased by a user and decremented when the user purchases images using system 100. For example, if a user chooses to download and print a digital image, the user account module 208 can decrement the user's credits thereby providing payment, and print the requested images onto a requested edible medium.

Licensed digital images can be charged on a per use basis. Thus, if the user prints the same licensed digital image on six cupcakes, the user may be charged six credits for using the licensed digital image six times. In some embodiments, the system 100 can allow printing of a licensed image multiple times on one sheet of edible media, for example, at the cost of one usage (e.g., one credit).

In the event that the user is short on credits, the user may be prompted to purchase additional credits by using a credit card, for example. If however, the user wishes to print non-licensed digital images, no credit charge will be transacted. Rather, the user will simply purchase any materials utilized.

In some embodiments, a selected licensed digital image can be instantaneously purchased from the central control device 132, for example, using the local control device 128 upon receiving (i) user-entered payment information and (ii) a user request for purchase of the selected licensed digital image. The payment information can, for example, allow access to an e-commerce system (e.g., within system 100) for purchasing licensed digital images using decrementable credits for printing licensed digital images. The e-commerce system can be adjustable for multiple currencies such as the U.S. Dollar, the Pound, and the Euro, just to name a few examples.

In some embodiments, users can pre-purchase credits that will enable a print function to be selectable within the GUI 127, for example. The pre-purchased credits allow for users to easily access licensed content as part of a custom design and print the design in an accelerated fashion. For example, if the user pre-purchased credits, the user may have been asked to sign a licensing/usage agreement at the time of purchasing the credits. Thus, when the user performs a transaction with such credits, additional forms and/or steps are not required of the user during design and print stages.

In some embodiments, the payment information includes credit card data rather than previously purchased credits. In some embodiments, the payment information includes credit card data presented for purchasing decrementable credits.

In general, the user account module 208 interacts with the image library module 202 to allow the user to purchase an image from the image library module 202. Once the user selects the desired image, the user chooses to complete the purchase. The user account module 208 will then complete the purchase. For example, the user account module 208 can verify whether the user has any available credits. If the user does have available credits, then one or more credits are debited from the user's credits and the user account module 208 authorizes the use of the image. If the user does not already have available credits, the user account module 208 may prompt the user for credit card information or bank account information for direct debit. Alternatively, the user account module 208 may already have this information and use previously stored financial information. The user account module 208 will charge the user the designated amount and authorize the use of the image to complete the purchase.

The user account module 208 allows a principal user to designate one or more secondary users. The user account module 208 interacts with the image library module 202, the license module 210, and the user location module 214 to allow the principal user to designate authorized images for the particular secondary user in specific geographical regions. A principal user accesses the user account module 208 and designates specific secondary users. The principal user then selects the image library module 202 and searches through the image library. The principal user designates which images are authorized for which secondary users. The principal user can also authorize different images for users in different geographic locations. This information is generally stored in the user account module 208. In an exemplary embodiment, the principal user could be a chain store bakery headquarters and the secondary user could be an in-store bakery of that chain. In another exemplary embodiment, the principal user purchases credits from the user account module 208, as discussed above. The principal user then designates a portion or all of the credits to one or more secondary users such that each secondary user can purchase images using the credits designated to the secondary user.

The license module 210 is a software module that includes information regarding the system's license to certain images. The license module 210 interacts with the image library module 202 and the user location module 214 to ensure that the user may only search and select for purchase licensed images. The user location module 214 informs the license module 210 of the user's geographic location. The license module determines whether restrictions exist on the sales of particular images in the user's location. If restrictions exist, the license module 210 requests that the image library 202 remove the unauthorized images from the images available to the user. In some embodiments, authorized lists or pre-filtered searching options can be applied to the available licensed content such that a user is pre-approved for finding and/or downloading particular content.

The license module 210 interacts with the image editing module 204 to ensure that any licensing restrictions on images are followed. Once the user selects a particular image, the license module 210 informs the image editing module 202 if any licensing restrictions exist that prevent the user from editing the selected image. If restrictions exist, the license module 210 presents the restrictions to the user.

The print module 212 is a software module that allows the user to print images using the system. Once the user has selected an image and is ready to print the image onto an edible media, the user selects to print the image. The print module 212 allows the user to select the appropriate color model for the printer in use. In some embodiments, the print module 212 detects an appropriate color model for the printer in use.

The print module 212 interacts with the edible media module 206 to verify that the user inputs a code, such as an edible media code, that corresponds to an authorized edible media. The edible media module 206 verifies that the code is valid and unused before the print module 212 proceeds with the print.

The user location module 214 is a software module that identifies the user's geographic location. In certain embodiments, this may be accomplished by comparing the user's IP address against publicly available databases. In other embodiments, the user location module 214 determines a user's geographic location from a stored user address list. For example, the user location module 508 accesses one or more user address lists to determine which users reside in a particular location. The user address list typically includes a number of users with corresponding physical mailing addresses. The user location module 508 accesses the user address lists to determine which geographic location is relevant for a particular user and provide a catalog of images having proper licensing for the determined geographic location. User address lists can be generated by a vendor or third-party and sent to individual systems (such as system 100). The user address lists can be uploaded by a user (e.g., a store manager) using storage media or uploaded automatically over the Internet. Although detecting IP addresses and user address lists are discussed above, any available method of determining an Internet user's location may be used.

The user location module 214 interacts with the license module 210 and the image library module 202 to ensure that the user can only select and purchase images that are licensed in the geographical area. For example, if an image is licensed to be sold or used in Canada, the same image may have requirements for use in the United States. As such, the user location module 214 can use license module 210 and image library module 202 to ensure image licensing laws are obeyed.

The user location module 214 interacts with the user account module 208 to ensure that a secondary user can only search and select for purchase images that have been authorized by a principal user. When a user selects to search for an image from the image library module 202, the user location module 208 identifies the user's location. The user location module 208 informs the user account module 214 of the user's location, so the user account module 208 can identify whether the user is a secondary user with geographic restrictions on the authorized images available to the user.

The social networking module 216 is a software module that allows the user to access social networking content. For example, the social networking module 216 may inform the user which of the available images are the most popular overall, the most popular for certain genders or age groups, or the most popular for certain events, such as birthdays. The social networking module 216 may contain user or consumer reviews of certain images. The social networking module 216 may also suggest ways that images can be altered using the image editing module 204. The social networking module 216 interacts with the image library module 202 to allow the user to purchase images identified in the social networking module 216. In some embodiments, the social networking module 216 allows the user to post and share finished images on social networking sites.

The augmented reality module 218 is a software module that allows the user to access augmented reality content when the system detects a valid augmented reality marker. The augmented reality module 218 scans incoming video data and identifies particular augmented reality markers in the video. The augmented reality module 218 includes augmented reality content that the user is allowed access to when the augmented reality module 218 detects a compatible augmented reality marker. The system can print images onto edible media that contain embedded augmented reality markers. The user can then display the decorated edible media to a video device. In certain embodiments, this video device is a web camera. The local control device sends the video data to the central control device. The augmented reality module 218 on the central control device scans the incoming video signal, and identifies a valid augmented reality marker. The augmented reality module 218 will respond by displaying augmented reality content. For example, in certain embodiments the augmented reality marker may be embedded in an image of a princess that is used to decorate a cake. The augmented reality module 218 may display a singing and dancing princess in response to recognizing the augmented reality marker.

The training module 220 is a software module that includes training content which instructs users on how to use the decorating system. The training module 220 may contain videos, lists of common questions and the answers thereto, diagrams, or any other training content that the user may find useful.

The ordering module 222 is a software module that includes inventory items for a system owner (e.g., a bakery owner, store owner) to access for reordering edible media, edible ink, replacement parts, printheads, and other system supplies.

The maintenance module 224 is a software module that includes maintenance menus for updating software, hardware, or inventory. The maintenance module 224 can additionally provide troubleshooting instructions, printer maintenance features, testing functions, and cleaning functions.

The reporting module 226 is a software module that includes mechanisms for reporting on sales, inventory, customers, errors, malfunctions, and other events occurring in system 200. In some embodiments, reporting data can be exported to comma delimited files, Excel files, or exported to particular reporting software. The reporting module 226 can additionally provide site metric reporting via NetInsight, Google analytics, or similar site metric reporting software.

The messaging module 228 is a software module that includes mechanisms for generating and sending electronic messages to users. For example, the messaging module 228 may send an electronic message to specific user accounts or groups of user accounts based on previous purchases. The module 228 may send system users receipts or other billing information in the form of a message. The messaging module 228 may also send advertising content or fliers to known users. In some embodiments, the messaging module 228 sends messages to system managers or store managers regarding system updates or image updates.

Other modules can be included in system 200. For example, service oriented third party applications can be merged or supplied as add-ins as appropriate. Similarly, online advertising content, Internet access, flash applications, database management, online shopping, and other services may be offered in system 200. Additionally, one or more of the modules of the system 200 could be stored on a remote server or on the cloud.

Account Management

User accounts can be managed by an administrator (e.g., a bakery or store owner). The administrator typically configures an administrative profile where administrative tasks can be carried out. For example, the system owner can log into an administrative profile for configuring the system 100, reviewing inventory reports, and purchasing consumables. The administrative profile can also include options to create additional user accounts, update or modify users or passwords, generate contact lists, browse and order consumables, view order or purchase histories, modify language parameters (e.g., Spanish, English, Mandarin, French, etc.), manage licensed image assets, edit pricing, etc.

Web Host Server

In some embodiments, all services described as resident on the local control device 128 may reside on a central web host server (e.g., central control device 132) and may be interactively accessed via the Internet 118 to use on the local control device 128. A web host server within local control device 128 is configured by the administrator to allow users to select particular edible items, select customization options, and preview designed products before printing. The administrator can add or remove user interface controls to provide or remove functionality in the GUI. For example, the administrator can modify a user interface within the web host server to ensure all design modification buttons are presented in one interface. This can provide the advantage of allowing the user to quickly modify designs without having to move through multiple screens.

In one example, the web host server includes updatable links with (i) helpful hints and exceptional cake design examples, (ii) how-to instructions, (iii) frequently asked questions, (iv) tips and tricks from other users, and (v) online demonstration videos, just to name a few example links. In some embodiments, a full help section is integrated into the system including tool tips, videos, etc.

In some embodiments, the web host server includes notification and messaging functionality. For example, the web host server may include calendar integration options complete with scheduling and reminder notifications for particular holidays, birthdays, etc. The notification functionality can also include customized templates or projects which can be attached to the notifications. For example, if a company provides customized birthday cakes for all employees, the company can create a birthday template coupled to each employee's birthday date in a reminder notification. The notifications can be configured to email a customer, for example, in advance of an event requiring configuration of an edible media item.

In some embodiments, the web host server includes advanced browsing options with predictive text and faceted search filters. As such, a customer can easily navigate images and enter text in an expedited fashion. The web host server is operable to attach metadata or categorical information to particular images, frames, characters, or reminders to facilitate users in improving design time for preparing an image for printing.

Website Content

The websites hosted in system 100 can include menus, buttons, and other controls. The websites generally include standard website content such as contact information, privacy policies, warranty information, a site map, advertising content, social media content, and licensing information. Other content may be provided in websites hosted in the system 100.

Image Manipulation

The systems disclosed herein can provide image manipulation functions. Image manipulation functions can be performed in the GUI 127 in a mocked up on screen version of the final product. Users can modify image media, backgrounds, frames, and text within the system 100. Functions for modifying and editing images include, but are not limited to color skewing, cropping, zooming, rotating, conversion to black/white or grayscale, and filtering. Images can be previewed, stretched, scaled, skewed, or otherwise manipulated in a graphical user interface to obtain a desired result for the user. Text can be added, removed, or otherwise modified. For example, text can be arced for a round design or angled for special effects. Text can be entered by a user or selected from a list of standard common phrases such as Happy Birthday, Congratulations, or Happy Anniversary, to name few examples. In some embodiments, watermarks can be added graphically and printed onto the edible media.

Media Authentication

The systems disclosed herein can provide media authentication for licensed images. For example, the system 100 validates particular licensed images for printing based on user information, image information, and/or product information. The system 100 provides an inventory system with trackable records. Each trackable record contains information regarding unique lot numbers assigned to each image to ensure image disclosures can be accounted for. Each trackable record can additionally contain quantity information for a product and media type compatible with such a product. Trackable records can be linked to user logs to determine customer accounts that activated particular products or images. This can be used to track lot numbers for recall purposes, for example. In some embodiments, the trackable records can be used as an advertising tool to market to one or more specific customer.

In some embodiments, the system 100 prevents unauthorized usage of licensed images by preventing the system and/or user from locally saving a licensed image. In addition, the system 100 prevents unauthorized usage of licensed images by preventing the user from accessing a particular licensed image more than once in one session, for example. Other mechanisms of preventing unauthorized usage of licensed images can be implemented.

Checkout

Upon determining one or more items for purchase, users can choose to checkout and purchase such items. The checkout process generally leverages standard e-commerce functionality using application programming interfaces (APIs) for performing transactions. The APIs can integrate functionality such as shopping carts, shipping options, order preview, order confirmation, payment options, add/remove functions, etc. The checkout process guides the user through transactions. In some embodiments, the checkout process can additionally manage reporting and accounting functions.

Figure 3:
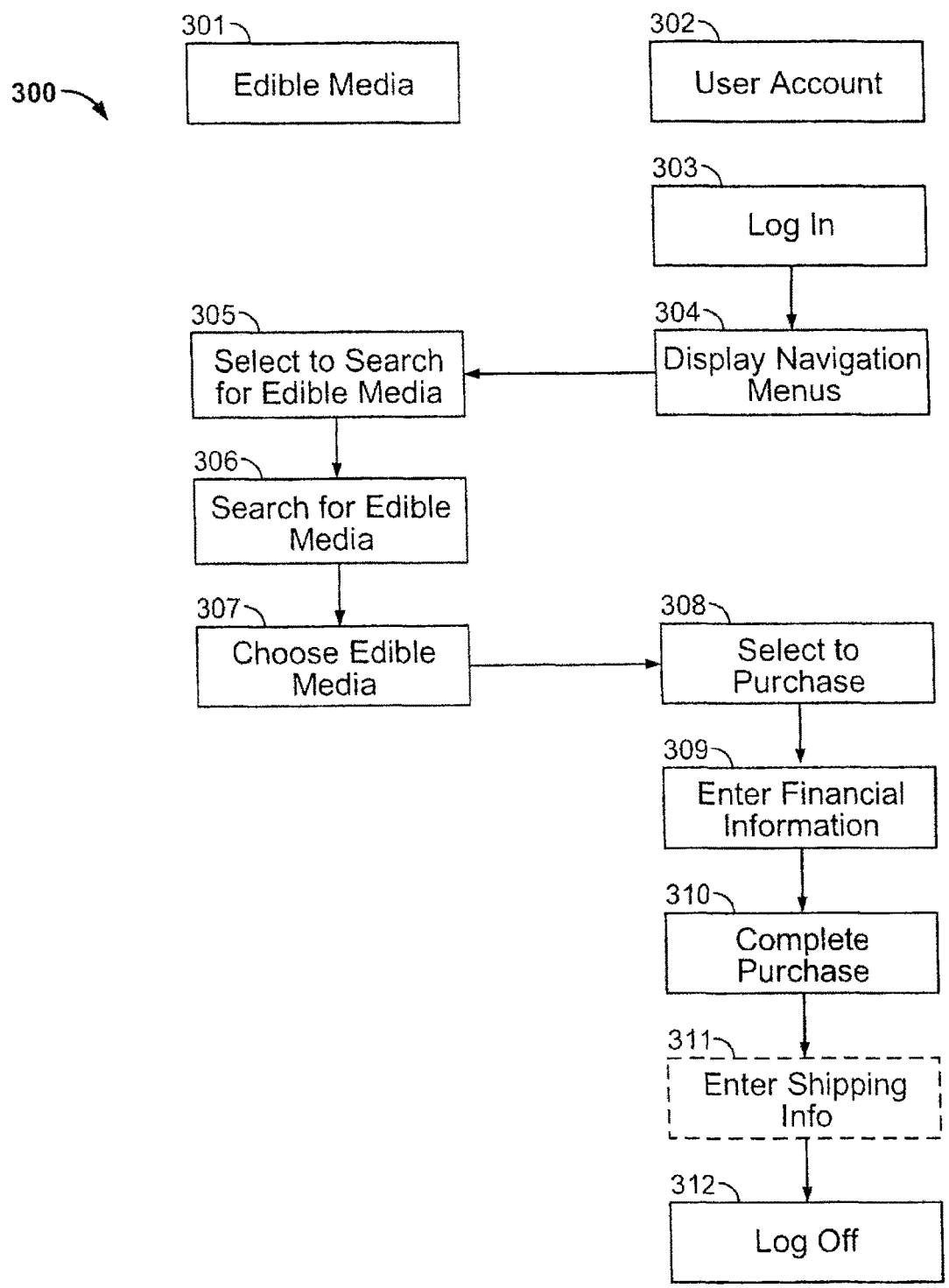
FIG. 3 is an example swim lane diagram of a process for ordering edible media.

FIG. 3 is an example swim lane diagram of a process 300 for ordering printed edible media. The process 300 can, for example, be performed in the online environment in system 100. Although the process 300 is described with reference to system 100, other systems, environments, or processors or other circuitry can perform the steps in process 300.

The online environment in system 100 may represent a website hosting one or more software modules. When executed on a device, each of the modules causes the device to perform the functionality described below. Software modules in this example include an edible media module 301 and a user account module 302. The edible media module 301 is a software module that includes information about printed edible media that is available for purchase, including current availability and inventory statistics. The user account module 302 is a software module that includes user accounts having profiles of information regarding particular users, such as financial information and address information. The user account module 302 can be configured to process financial transactions.

The user accesses a user interface element in the website, such as GUI 127 to access the user account module 302. The user account module 302 presents a logon screen to the user and requests entry of a username and password. The user inputs the user name and password to login (303) and the user is logged into the system 100.

The user account module 302 displays navigation menus (304). The navigation menus include a number of options representing different ways that the user may use the system 100. Options can include, but are not limited to quick launch items (e.g., quick copy, quick upload, quick print, etc.), photograph manipulation options, framing configuration options, artwork selection and manipulation options, purchasing options (e.g., enter media codes, user data, etc.), ordering options (e.g., pre-order forms), photo cake configuring options, settings options, and administrative options (e.g., shut down, restart, test system, etc.). The user can also choose to open a prior design to print copies on new edible media. Other options are possible.

The edible media module 301 provides an option to select to search for printed edible media (305). For example, the edible media module 301 offers the user the option of searching for specific printed edible media or browsing through a catalogue of printed edible media. The user navigates through the catalogue (306) and selects the printed edible media that the user wishes to purchase (307). In some embodiments, the user is provided an option to select multiple types of printed edible media in a single purchase. When the user has selected the desired printed edible media, the user instructs the user account module 302 that the user is ready to complete the purchase (308). The user is directed to the user account module 302, which processes the purchase of the printed edible media.

The user account module 302 prompts the user to enter the user's financial information (309). The user may enter credit card information or bank account information for direct debit. In certain embodiments, the user account module 302 may store the user's financial information. The user has the option of using previously used financial information that is remembered by the user account module 302. The user account module 302 then completes the purchase (310) by charging the user according to the information that has been entered.

In some embodiments, the user account module 302 provides an option for shipping purchased printed edible media to the user. The user account module 302 may request additional information, such as an address the edible media should be sent to, or which shipping method the user prefers. Alternatively, the user account module 302 may retain previously used address information, in which case the user may choose to use previously stored information. The user completes the process 300 by logging off of the system (312).

Figure 4:
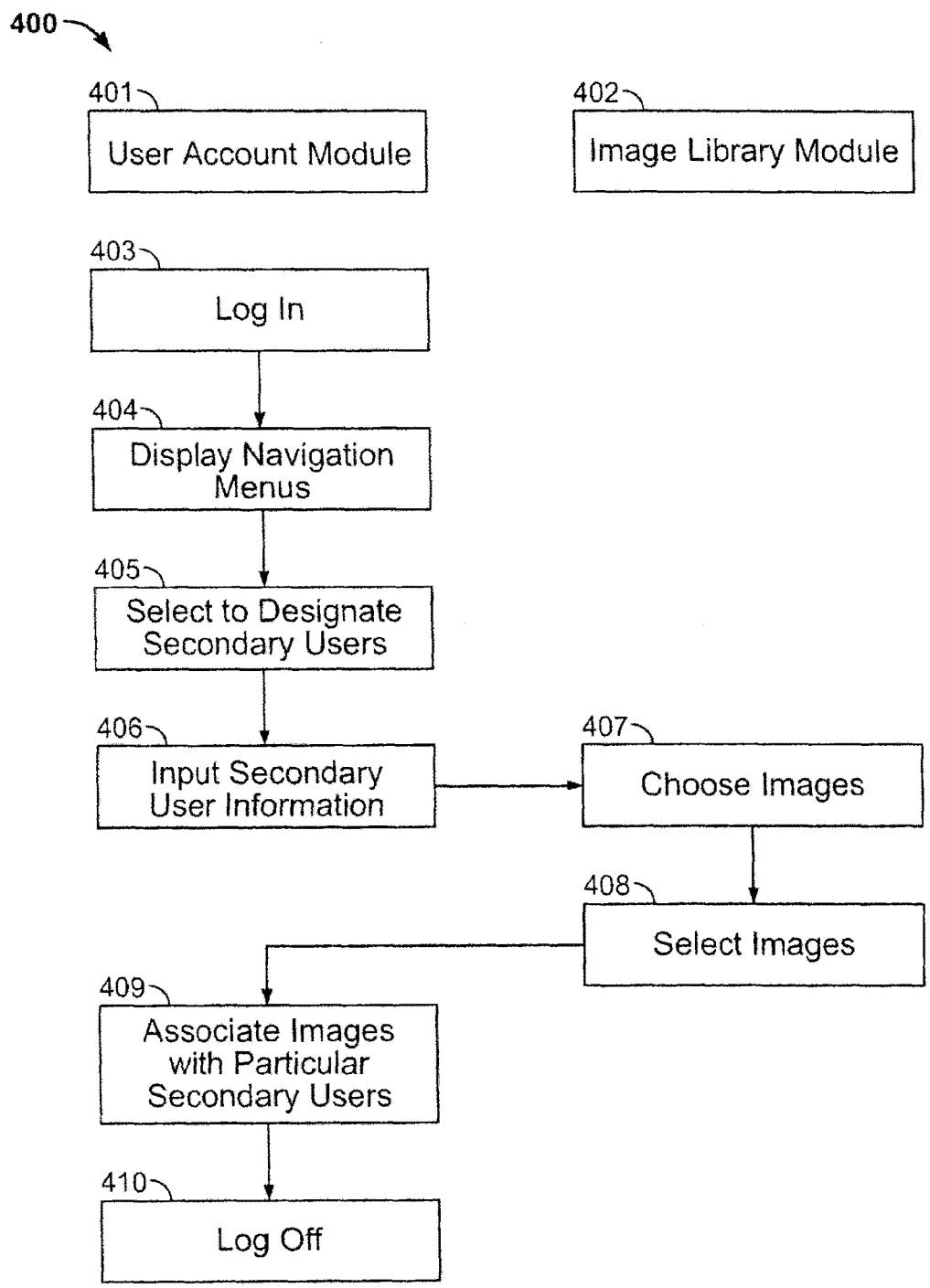
FIG. 4 is an example swim lane diagram of a process for a principle user to authorize secondary users and designate authorized images for the secondary users.

FIG. 4 is an example swim lane diagram of a process 400 for a principle user to authorize secondary users and designate authorized images for the secondary users. The process 400 can, for example, be performed in the online environment in system 100. Although the process 400 is described with reference to system 100, other systems, environments (including on-line environments), or processors or other circuitry can perform the steps in process 400.

The online environment includes an Internet website hosting a user account module 401 and an image library module 402. When executed on a device, each of the modules causes the device to perform the functionality described below. The user account module 401 is a software module that includes user accounts containing profiles of information regarding particular users. The image library module 402 is a software module containing a searchable and browsable library of images.

The principal user accesses the user account module 401 and logs in to the principal user's account (403) by entering the principal user's user name and password. The principal user is shown a navigation menu containing a number of selectable options (404).

The principal user selects to designate secondary users (405). The principal user is then prompted for information regarding the secondary users and how such secondary users will be identified (406). For example, the principal user may be asked to enter unique user names and passwords for secondary users. Alternatively, the principal user may enter email or physical address information for the secondary users. The secondary users may be sent instructions on how to access their new secondary user accounts. The user account module 401 saves the information given on the secondary users, and associates the secondary user accounts with the principal user's account.

The image library module 402 allows the principal user to search for authorized images for the secondary users (407). The principal user searches or browses through available images, using keyword criteria such as "Disney" or "Princess" or "Birthday." The principal user selects images, or groups or categories of images, that will be authorized for the secondary users and the image library module 402 receives the selections (408).

Once the principal user has finished searching through the images and selecting images, the principal user selects to associate particular images and the user account module 401 associates the selected images with the particular secondary users (409). The user account module 401 displays the designated secondary users, and the principal user associates the selected images, groups or images, or categories of images with specific users. The user designates different authorized images for users in different geographic locations. The principal user can subsequently log off of the system 100 (410). Thereafter, whenever the secondary users accesses the system, only those images authorized by the primary user will be visible and accessible to the secondary user.

FIGS. 5A-5D depict an example swim lane diagram of a process 500 for decorating an edible medium. The process 500 can be performed by system 100, for example, in the online environment in system 100. Although the process 500 is described with reference to system 100, other systems, environments, or processors or other circuitry can perform the steps in process 500.

Figure 5A:
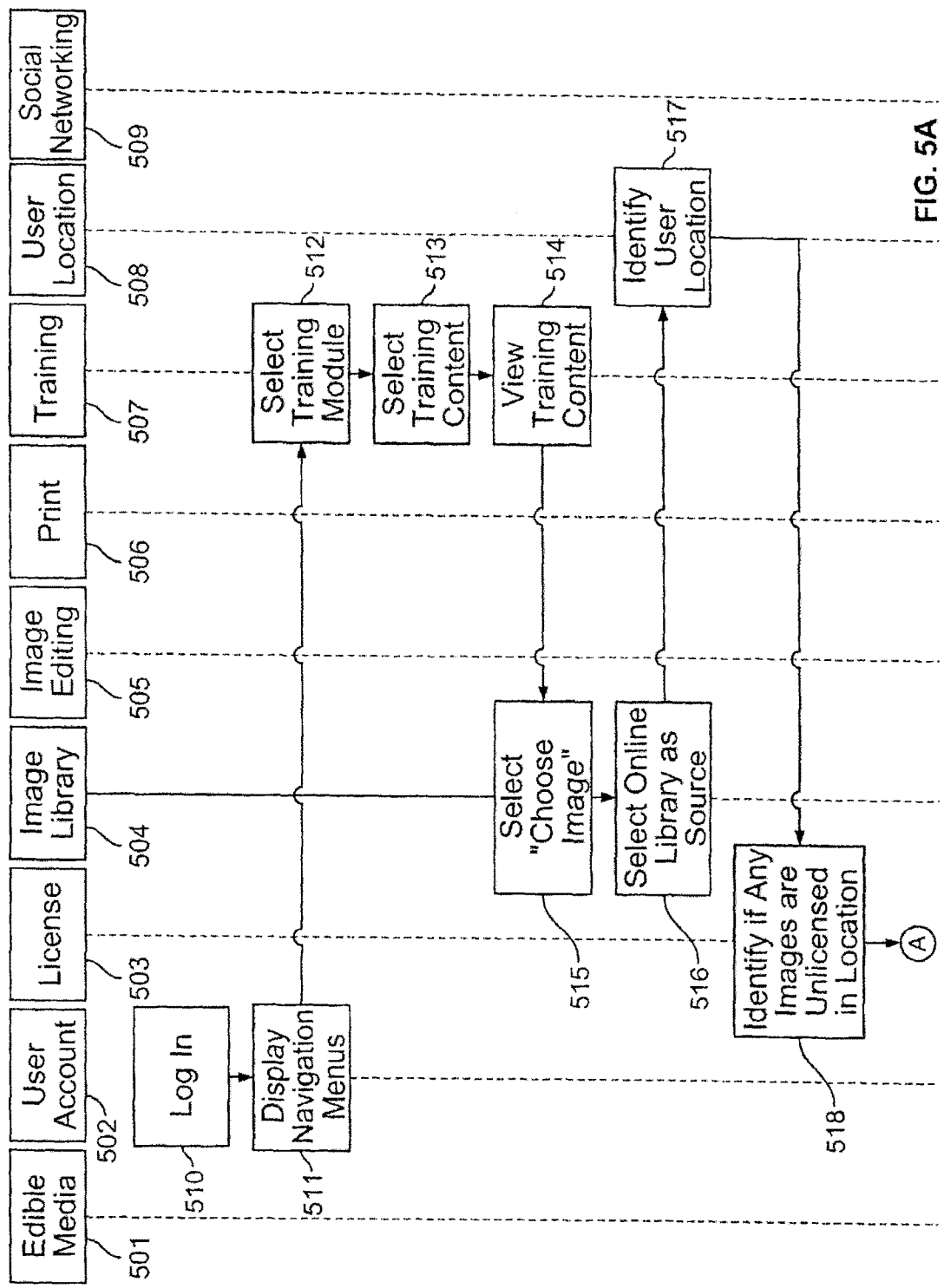
FIGS. 5A-5D depict an example swim lane diagram of a process for a decorating an edible medium.

Referring now to FIG. 5A, an Internet website includes a number of modules 501-509. When executed on a device, each of the modules causes the device to perform the functionality described below. An edible media module 501 is a software module that includes information about which edible media are compatible with the system 100 and characteristics of the individual types of edible media. The edible media module 501 includes a database of unique codes and information on whether or not the particular codes have been used or not.

A user account module 502 is a software module that includes profiles of information regarding particular users. The user account module 502 allows or disallows users to login to user accounts using a username and a password. The user account module 502 also stores financial information and address information about the user and processes financial transactions.

A license module 503 is a software module that includes information about system licensing to certain images. System licensing information may include data identifying where particular images can be sold and if and/or how the images may be edited.

An image library module 504 is a software module that includes a searchable and browseable library of images. The image library module 504 also allows the user to upload images from local image sources to use in the system.

An image editing module 505 is a software module that allows a user to edit images. A print module 506 is a software module that enables the printing of selected images onto edible media using a specific color model for a particular printer. A training module 507 is a software module that includes training content that instructs users to use the system 100. A user location module 508 is a software module that identifies the geographic location of the user. The user location module 508 can ensure that licensing restrictions are obeyed. In addition, the user location module 508 can allow principal users to control which images are offered for sale to secondary users in certain geographic zones. A social networking module 509 is a software module that allows a user to access social networking content and resources.

In operation, the user inserts an edible media into the printer. The user accesses the user account module 502 using the GUI 127 and logs into the user's account (510) by entering the user's unique username and password. The system 100 displays a menu containing a number of navigation options (511).

The user may select the training module 507 to learn how to use the system to decorate edible media (512). The training content may be any content that aids the user in using the system. In certain embodiments, the training module 507 may contain video demonstrations, written instructions, and lists of common questions and answers. The user selects the training content for viewing (513) and the training module 507 presents the selected training content to the user (514).

After viewing the training content, the user can choose an image to use to decorate an edible media (515). The user can additionally select an image source. The user may choose a local image source, an online image source, or the image library in the image library module 504, for example. In this example, the user selects the image library as the image source (516).

The system 100 accesses the user location module 508 and determines the geographic location of the user (517). In certain embodiments, the user location module 508 determines the geographic location by looking up the user's IP address and associating the user's IP address with a geographic location. Other methods of determining the user's geographic location may be used.

After the user's geographic location is determined (517), the system 100 accesses the license module 503 and determines whether any licensing restrictions exist for the selected images in the user's geographic location (518). For example, the system 100 determines the user's physical address from an authorization list and verifies whether any licensing restrictions exist. If licensing restrictions exist for the user's geographic location, the system 100 narrows the number of images provided to the user. If licensing restrictions do not exist for the user or the user's geographic location, the system 100 can provide the user with all licensed images. The system 100 can additionally provide free images, non-copyright images, or third party designed images.

Figure 5B:
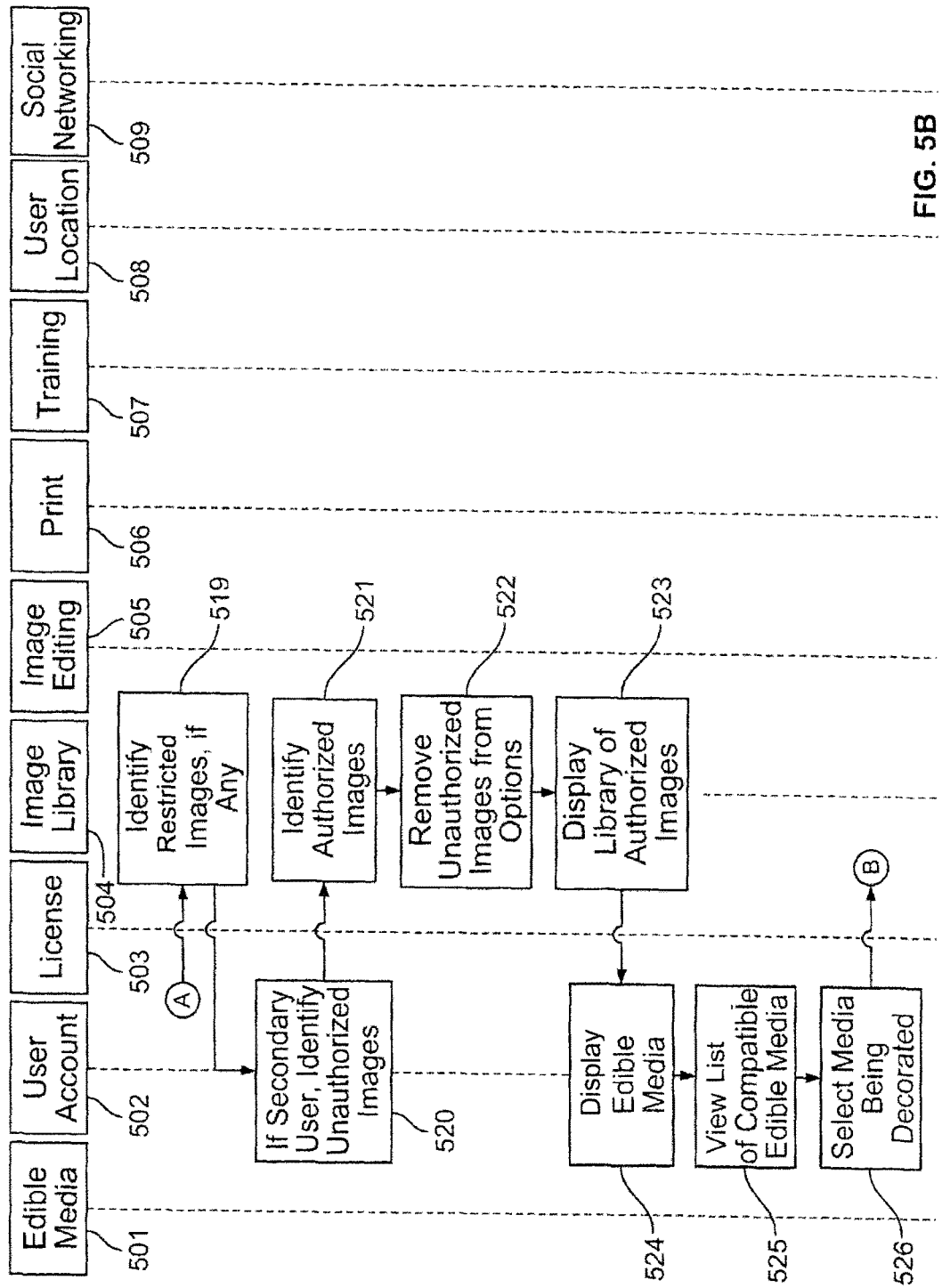

Referring now to FIG. 5B, upon determining whether licensing restrictions exist, the license module 503 informs the image library module 504 whether any of the images are restricted from being sold in the user's location (519). The system 100 identifies whether there are any restrictions from the user account module 502 on the images that the particular user is authorized to purchase (520). For example, the particular user may be a secondary user, in which case a principal user may have previously instructed the system 100 which images the secondary user is authorized to purchase. If the particular user has restrictions on which images the user is authorized to purchase, the user account module 502 sends the list of authorized images to the image library module 504 (521).

The image library module 504 receives information on which images are available to the particular user from both the user account module 502 and the license module 503. The image library module 504 removes the unauthorized images from the library of image options available to the user (522). The image library module 504 displays to the user a searchable and browseable library of images available to the user for purchase or use (523). The user may search through the images, using word searching, or alternatively by browsing through image categories and viewing all images in a category.

The edible media module 501 displays a list of the edible media that may be used with the system 100 (524). The user then views the list of compatible edible media (525). The user selects from the list of edible media the type of edible media that is being decorated (526).

In some embodiments, the user can choose to access the social networking module 509 to aid the user in choosing an image. The social networking module 509 can be used in a number of ways. For example, the social networking module 509 may inform the user which of the available images are the most popular over all, the most popular for certain genders or age groups, or the most popular for certain events, such as birthdays, holidays, or other events. The social networking module 509 may include user or consumer reviews of certain images. The social networking module 509 can suggest ways that images can be altered using the image editing module 505.

Figure 5C:
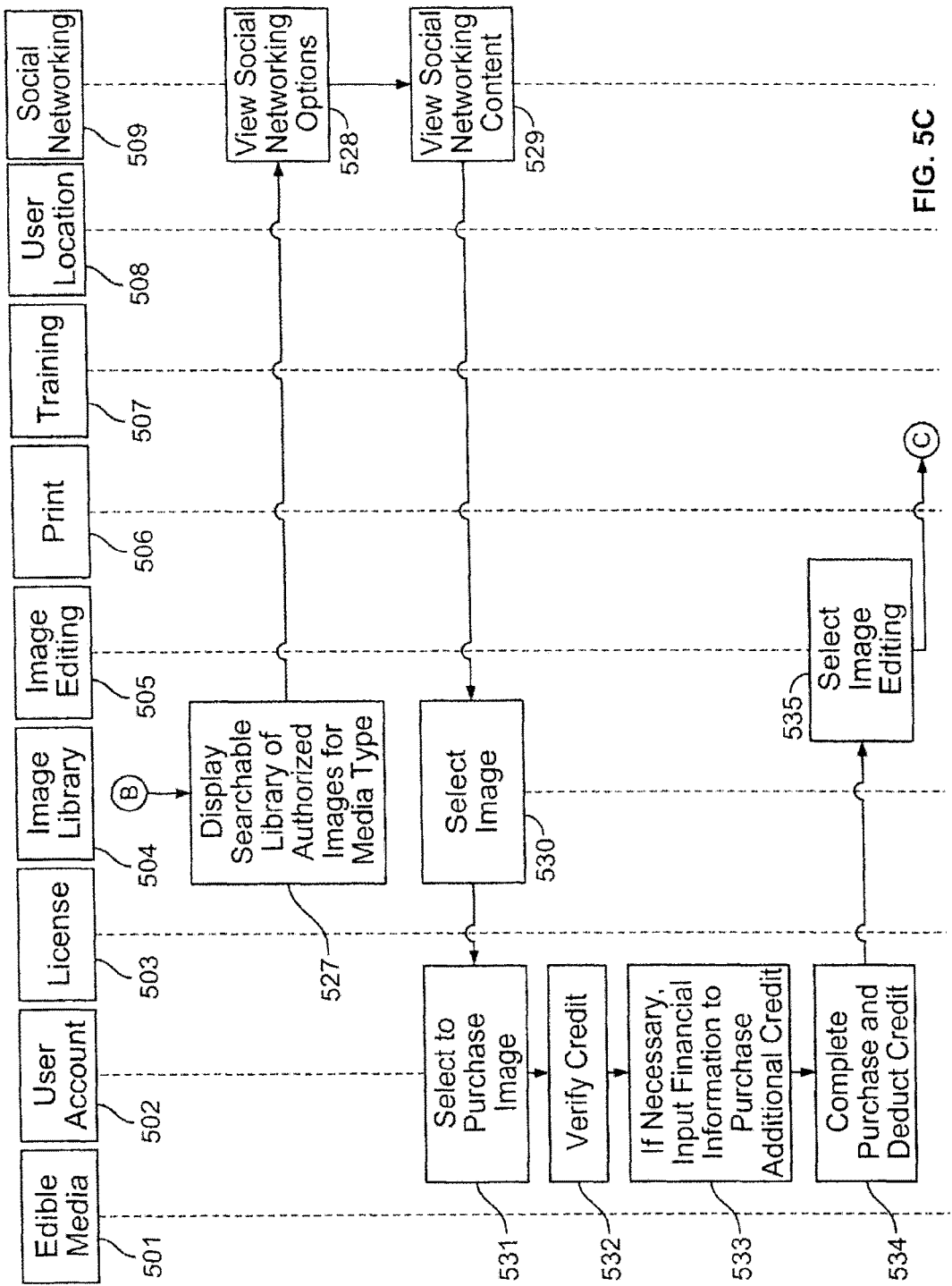

Referring now to FIG. 5C, the user can request to view one or more libraries of images. The image library 504 displays at least one searchable library of authorized images for the user-selected media type (527). The user selects to view social networking options (528) and selects a social networking option to view the social networking content (529).

The user selects an image (530) and instructs the system that the user wishes to purchase the image (531). The user account module 502 checks to see whether the user has sufficient credit to purchase the image (532). If the user does not have sufficient credit, the user has the option of purchasing more credit (533). The user is prompted to enter financial information, such as a credit card to be charged or a bank account for direct debit. Alternatively, the user may choose to use previously-entered financial information stored in the user's account in the user account module 502. In some embodiments, the user may enter address information and request an invoice of a printing/purchasing transaction. In the event that the user has sufficient credit, the user is asked to confirm the purchase. Upon confirmation by the user, the purchase is completed and the credit is deducted from the user's account (534).

Figure 5D:
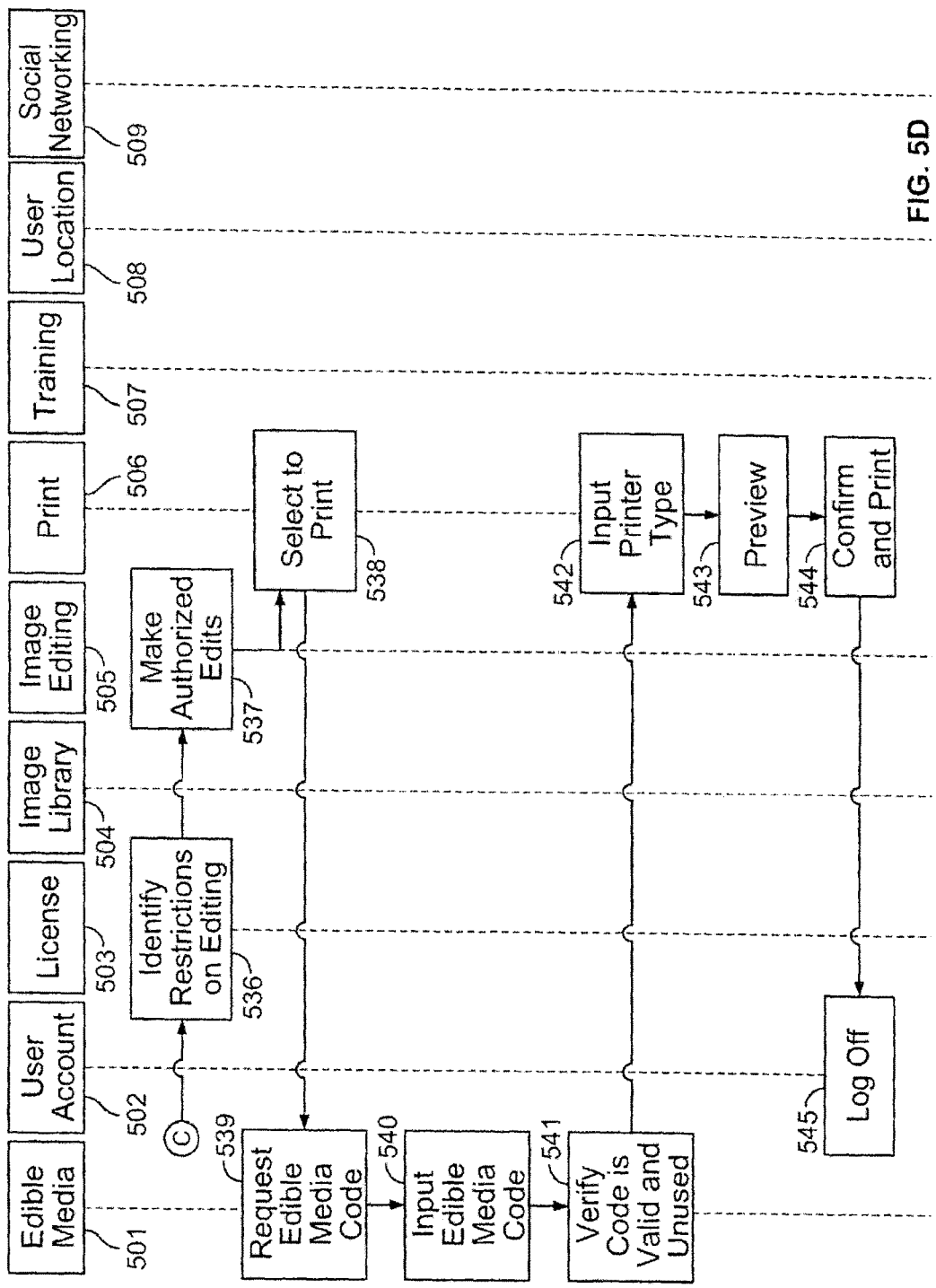

In some embodiments, the user may choose to edit the purchased image (535). Editing a purchased image can be performed using the image editing module 505. Referring now to FIG. 5D, the image editing module 505 verifies with the license module 503 that the user is authorized to modify the image. The verification identifies restrictions on editing particular images (536). If a license does not prevent the image from being altered, then the user makes desired edits to the image (537). The user may be able to crop, rotate, resize, brighten, darken, re-touch, and perform other operations to the selected image. In some embodiments, text may be added to personalize the image (e.g., "Happy Birthday, John!").

The user selects to print the image (538). The print module 506 prepares to print the image and, in some embodiments, the edible media module 501 prompts the user to enter a code (539) to prevent unauthorized use. The user can find the code (e.g., edible media code) in a location on the edible media, or on the packaging and documentation sent to the user with the edible media. The user inputs the edible media code (540). The edible media module 501 verifies that the inputted code is valid and that the code has not been previously used (541).

The user is prompted to input a printer type for use in printing on the edible media (542). The image library module 504 stores different versions of the same image that are compatible with different printer color models. The print module 506 ensures that an image compatible with the color model of each selected printer is sent to the printer.

Once the printer information is inputted, the print module 506 provides the user the option of viewing a preview of the image printed onto the selected edible media. If the user wishes to see a preview, then the image is displayed to the user (543). If the user declines, or once the preview has been shown, then the user is asked to confirm the print. Once the user confirms the print, the print information is sent to the system printer and the image is printed onto an edible media (544). Upon completion of the printing process, the user selects to log off the system (545).

At any point, the user can choose to clear a design in progress or reset the design in progress to a previous state. This option provides the user an efficient mechanism to remove mistakes or simply begin a new design.

Figure 6:
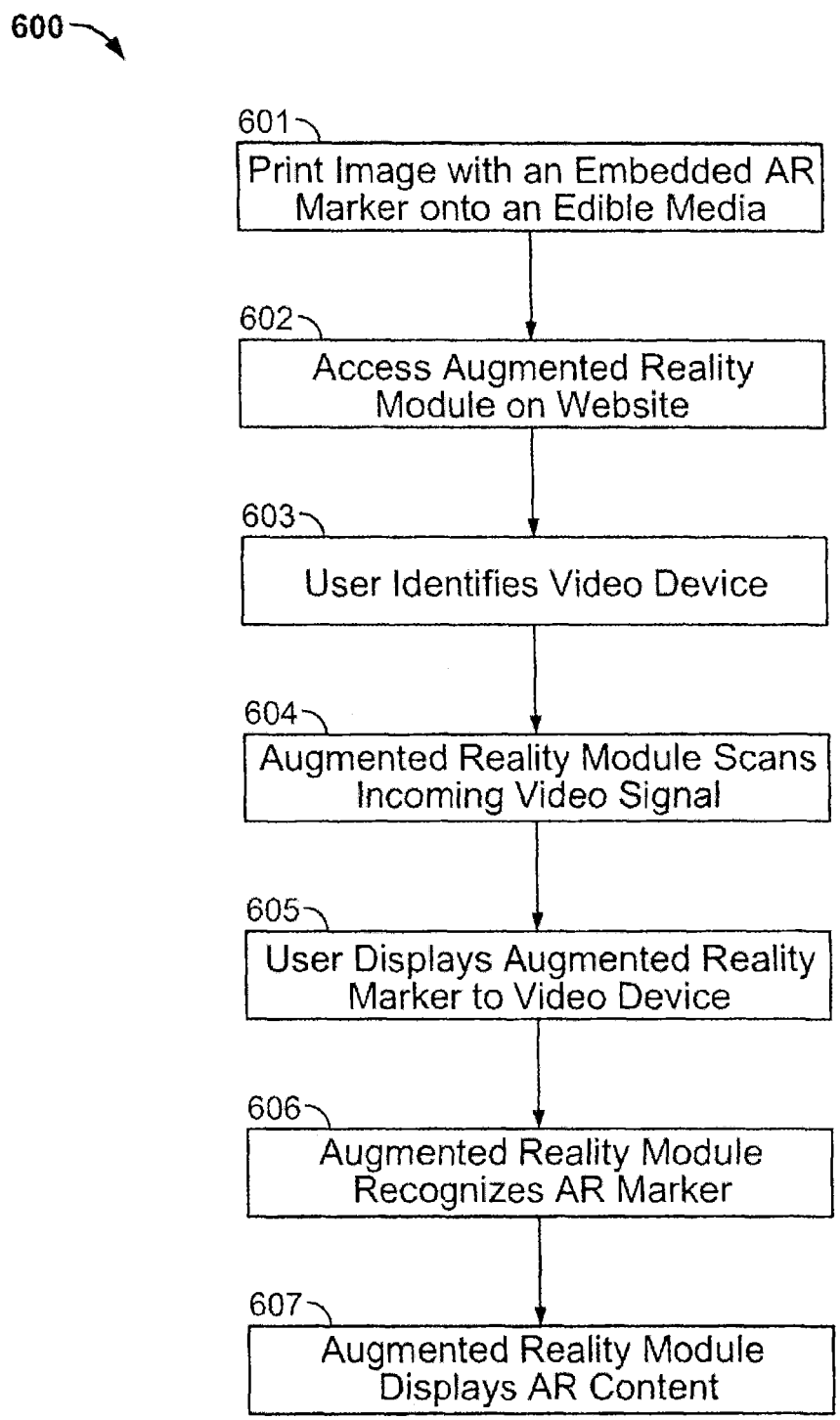
FIG. 6 is an example flow diagram of a process for displaying augmented reality content using a decorated edible medium with an augmented reality marker.

FIG. 6 is a flowchart diagram of a process 600 for viewing augmented reality content using the system. Although the process 600 is described with reference to system 100, other systems, environments, or processors or other circuitry can perform the steps in process 600. The system of FIG. 1 may be used to print an image containing an embedded augmented reality marker onto an edible media. The user can use the image with the embedded augmented reality marker to access augmented reality content.

The embedded augmented reality marker may be any uniquely recognizable shape with at least two colors, of sufficiently high contrast to allow the augmented reality marker to be recognized when scanning a video signal. The augmented reality marker shape is not required to be related to the augmented reality content, but can be any uniquely recognizable combination of shape and colors.

The augmented reality content may be any content that combines reality with virtual reality. For example, the augmented reality marker may be embedded in an image of a popular cultural figure or may be the figure itself, including a three-dimensional embodiment. The augmented reality content shown to the user could be a display of the cultural figure from the image singing and dancing. In another example, the augmented reality content could be the opportunity to purchase items related to the image, which are otherwise unavailable for purchase.

The system 100 prints an image with an embedded augmented reality marker onto an edible media (601). For example, the printing can be performed using the process 500 of FIG. 5. After printing the image with an embedded augmented reality marker onto the edible media, the system 100 accesses the augmented reality module 218 on the website. In certain embodiments, the user enters a web address into the web browser of the local control device 128 and selects the augmented reality module 218.

The user identifies the video device (603). For example, the user instructs the augmented reality module 218 of the source of the incoming video signal. The augmented reality module 218 prompts the user to enter a specific video device location. The augmented reality module 218 may communicate with the local control device 128 to determine which video devices are installed for use on the local control device 128. In some embodiments, the augmented reality module 218 can display to the user a list of possible video devices for the user to select a particular device. The user selects a video device.

The augmented reality module 218 scans incoming video signal (604). The augmented reality module 218 scans the incoming video signal to detect the video signal for a valid augmented reality marker.

The user displays the edible media containing the augmented reality marker to the video device (605). The video device thus captures video footage of the augmented reality marker and sends the video signal to the augmented reality module 218 on the system controller.

The augmented reality module 218 recognizes the augmented reality marker (606). The augmented reality module 218 can continually or periodically scan incoming video data to detect other valid augmented reality markers. When the user displays an edible media with an augmented reality marker printed upon the media to the video device, the augmented reality module 218 recognizes the marker in the incoming video signal. The augmented reality module 218 responds to the user by displaying augmented reality content (607).

Figure 9:
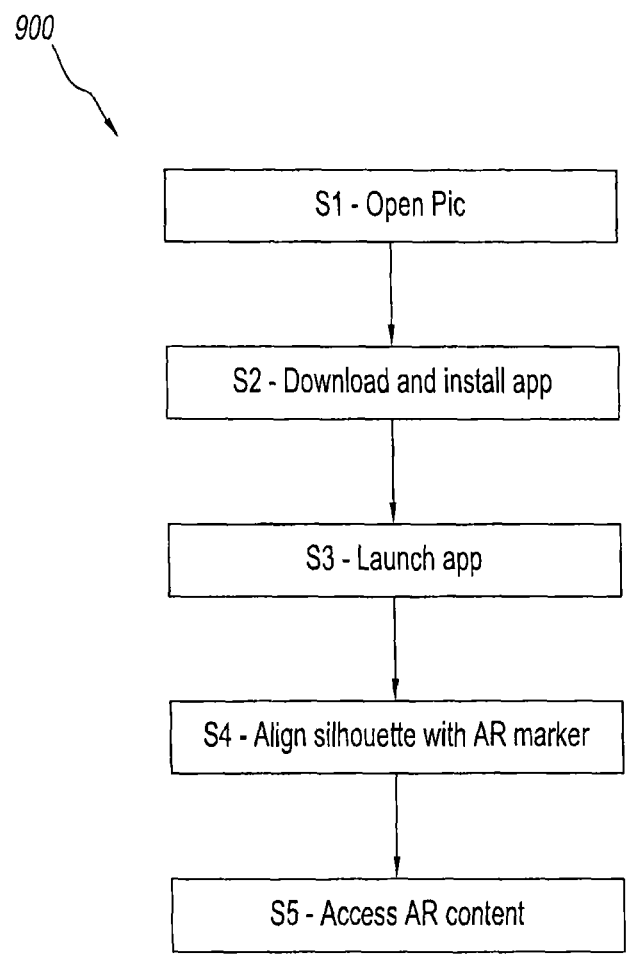
FIG. 9 is another example flow diagram of a process for displaying augmented reality content.

FIG. 9 is a flowchart diagram of an alternative process 900 for viewing augmented reality content using a smartphone, tablet computer, or other mobile device. Although the process 900 is described with reference to a mobile device, other systems, environments, or processing circuitry, can be used to perform the steps in process 900. An image containing an embedded augmented reality marker is included in a cake decoration, such as a printed edible media or decorative pic. The augmented reality marker is a unique combination of shape, color, and/or contrast that can be recognized by an application executed by the mobile device, by the operating system of the mobile device, or by firmware of the mobile device. As discussed further below, the augmented reality marker allows the user to access content related to the augmented reality marker on their mobile device.

In step S1, the user reveals a QR code that can be scanned and/or a URL address that can be entered into the user's device. The QR code and/or URL address are located on the edible media or on a cake decoration, such as a decorative pic. In some embodiments, the QR code and/or URL address are revealed by opening the pic, examples of which are shown in FIGS. 10A-10F and discussed further below, to an inside face that leads the user to an app store from which they download and install an application or app on their mobile device, which is step S2. In step S3, the user launches the app. In some embodiments, a silhouette will appear on the mobile device. The silhouette corresponds to an outline of an augmented reality marker embedded in an image on the cake decoration. The user then aligns the silhouette with the augmented reality marker on an inside face of the pic in step S4. Once the silhouette is properly aligned with the augmented reality marker, in step S5, the application will allow the user to access augmented reality content within the application associated with the reality marker. The augmented reality content may be stored locally within the app or may be stored on a remote server or on the cloud and accessed by the application at the appropriate time. The content is digitally rendered images superimposed on the view of the real world seen on the display of the user's mobile device. In an exemplary embodiment, the content is only available to the user after the user has aligned the silhouette with the augmented reality marker such that the app recognizes the augmented reality marker.

Exemplary embodiments of a decorative pic are shown in FIGS. 10A-10F. The pic 1000 shown in FIG. 10A includes a prong 1002 to be inserted into the cake or other food product, such as a cupcake, pie, etc. and a body 1004 that, when the prong 1002 is inserted into the cake, protrudes from the cake. The body 1004 of the pic can be a folded sheet in the shape of a graduation cap, a balloon, or other known shape. The body 1004 can have text or an image on a front outer surface such that the text and/or image are visible when the body 1004 is in the folded state. The body 1004 of the exemplary pic 1000 shown in FIG. 10A has an outline in the shape of a graduation cap, includes an image of a graduation cap on a front surface of the body 1004, and has the text "Congrats Graduate! App" thereon to indicate to the user (i.e. the recipient of the cake) that the pic 1000 is associated with augmented reality content such as the Congrats Graduate! App discussed further below. The outside surface of the body 1004 can also include text such as "open here" to indicate to the user that the body is a folded sheet that can be opened.

Figure 10A:
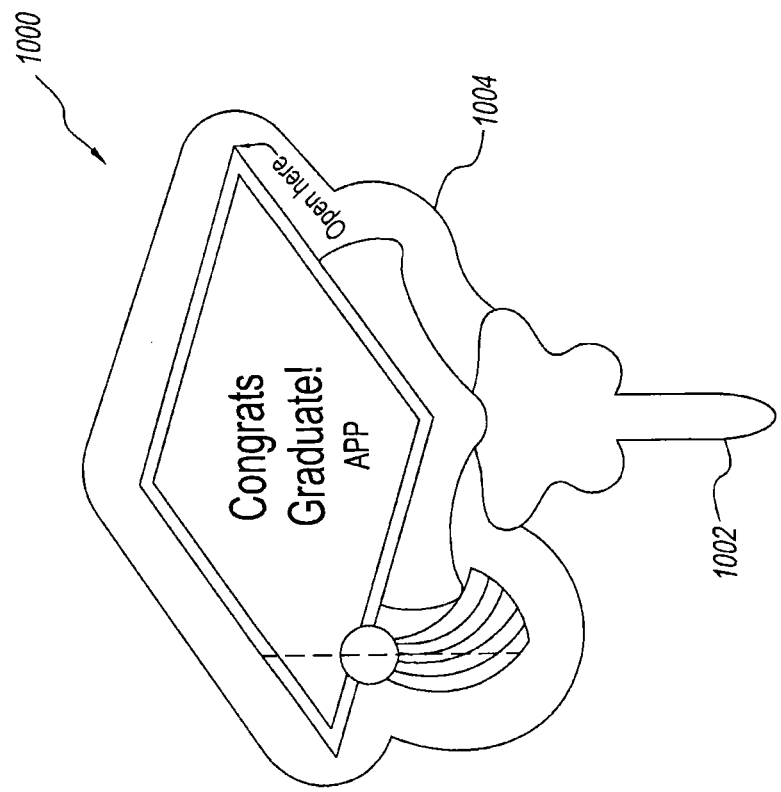
Figure 10B:
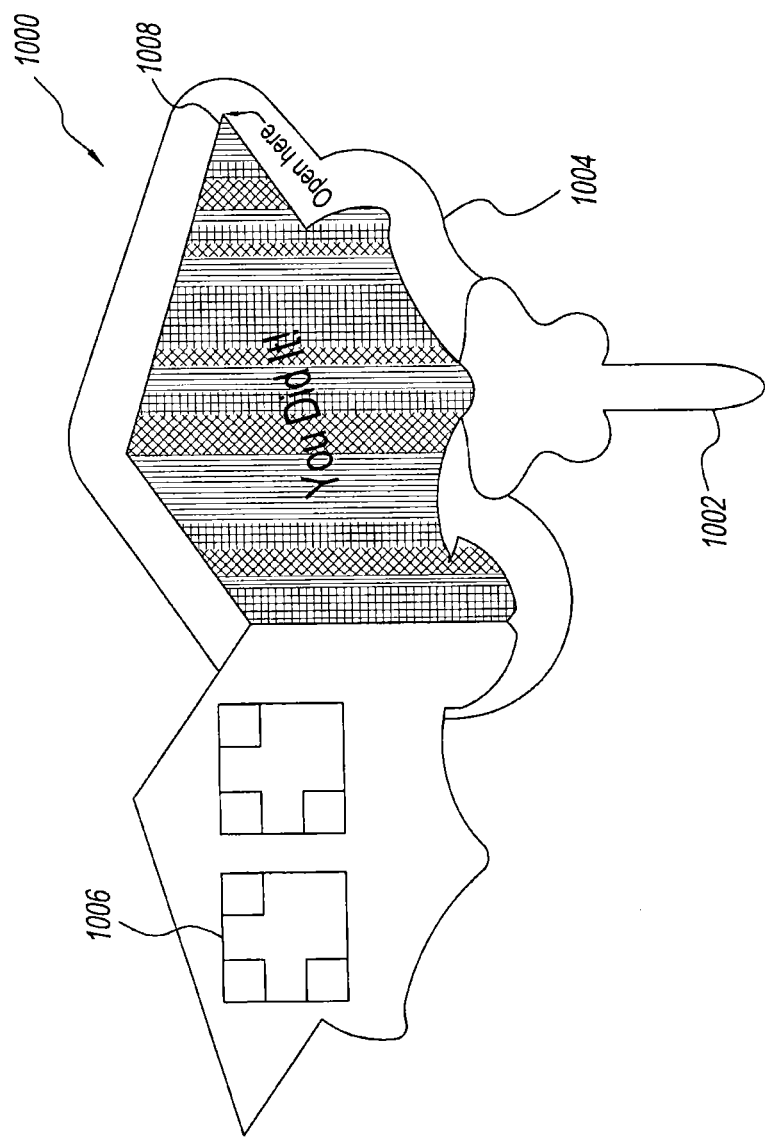
Figure 10C:
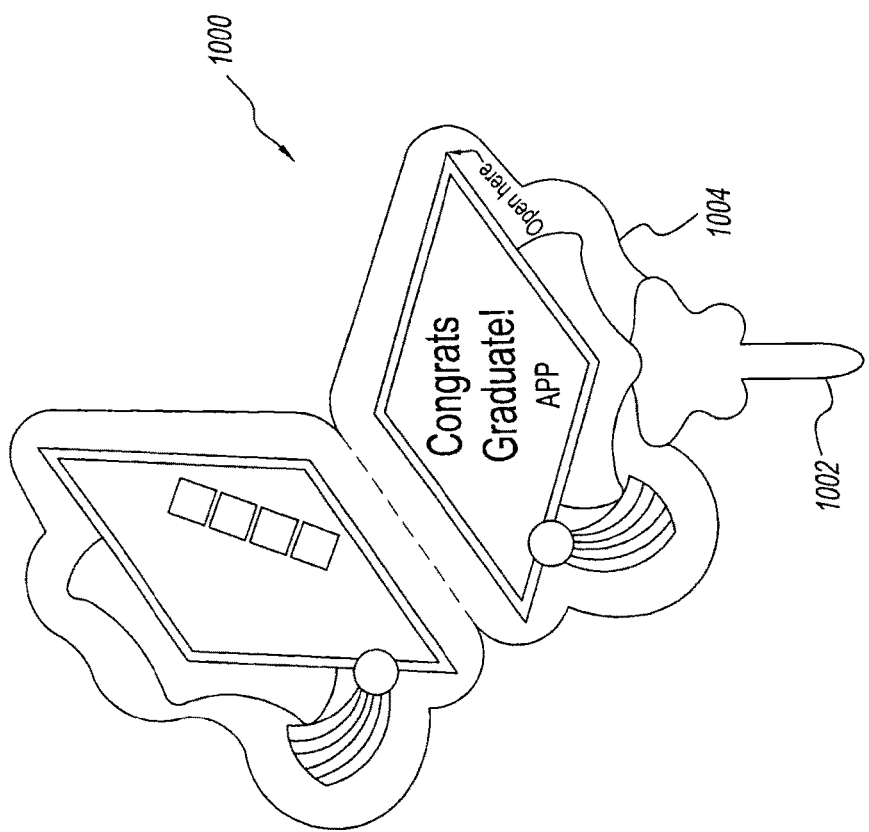

The user opens the folded sheet of the body 1004 to reveal one or more QR codes 1006 on a first inside surface of the folded sheet, as shown in FIG. 10B. Each QR code can lead the user to a new mobile application, or app, associated with the pic 1000. For example, the user can use their smartphone as a QR-code scanner and then download the new app from the website launched by scanning the QR code. A first QR code can include information to open a website by which the user can download a new app that runs on a first operating system, such as Android. A second QR code can include information to open a website by which the user can download a new app that runs on a second operating system, such as iOS. Text below the QR codes 1006 on the first inside surface can indicate to the user that the QR codes 1006 allow the user to download a free app onto their mobile device. In an alternative embodiment, a single QR code can lead the user to a website that allows the user to select an app for downloading that works with their operating system. In another alternative embodiment, a single QR code can be used which directs the user to a website that detects the type of operating system operating on the mobile device and redirects the user to a relevant application store such as the Play store or the App store.

A second inside surface of the folded sheet includes an augmented reality marker 1008 that enables the user to access augmented reality content in the downloaded app. In the example shown in FIG. 10B, the augmented reality marker 1008 is formed in the shape of a graduation cap. The cap can be a solid color or can be more than one color in a pattern. The border formed by the outside surface surrounding the cap can be a different color than the cap so as to form a buffer around the augmented reality marker to make the marker easier to recognize for the app. The border could also be formed on the inside surface.

Figure 11A:
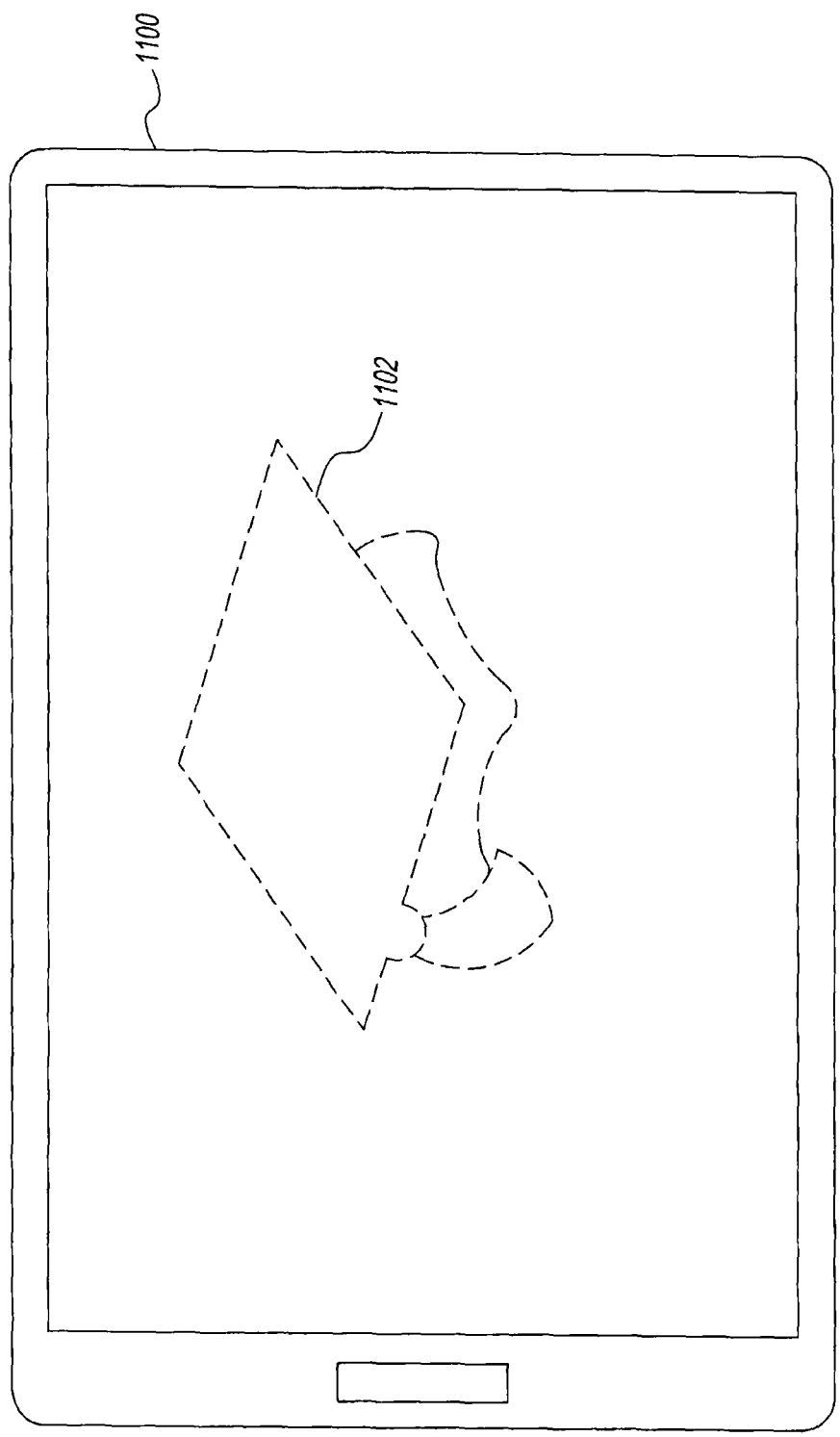
Figure 11B:
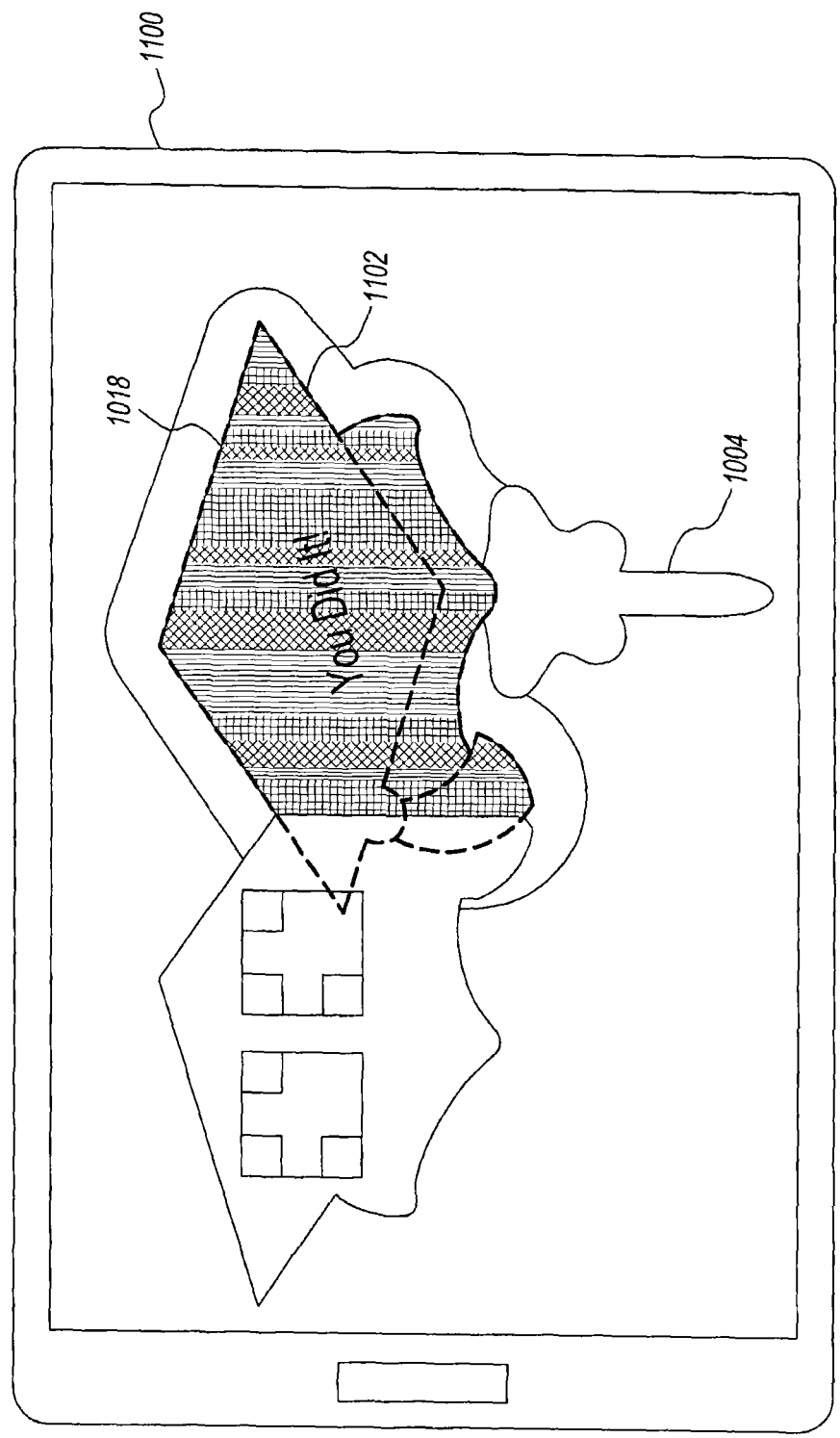

In order to access the augmented reality content, the user launches the app downloaded by way of the QR code and scans the augmented reality marker 1008 with a camera in the user's mobile device. As shown in FIG. 11A, the app displays a silhouette 1102 on the user's mobile device 1100 that has the same shape as the border surrounding the augmented reality marker 1008. When the user aims the mobile device 1100 such that the silhouette 1102 on the screen is aligned with the border surrounding the augmented reality marker 1008, as shown in FIG. 11B, the app recognizes the augmented reality marker 1008 and displays the augmented reality content.

Figure 11D:
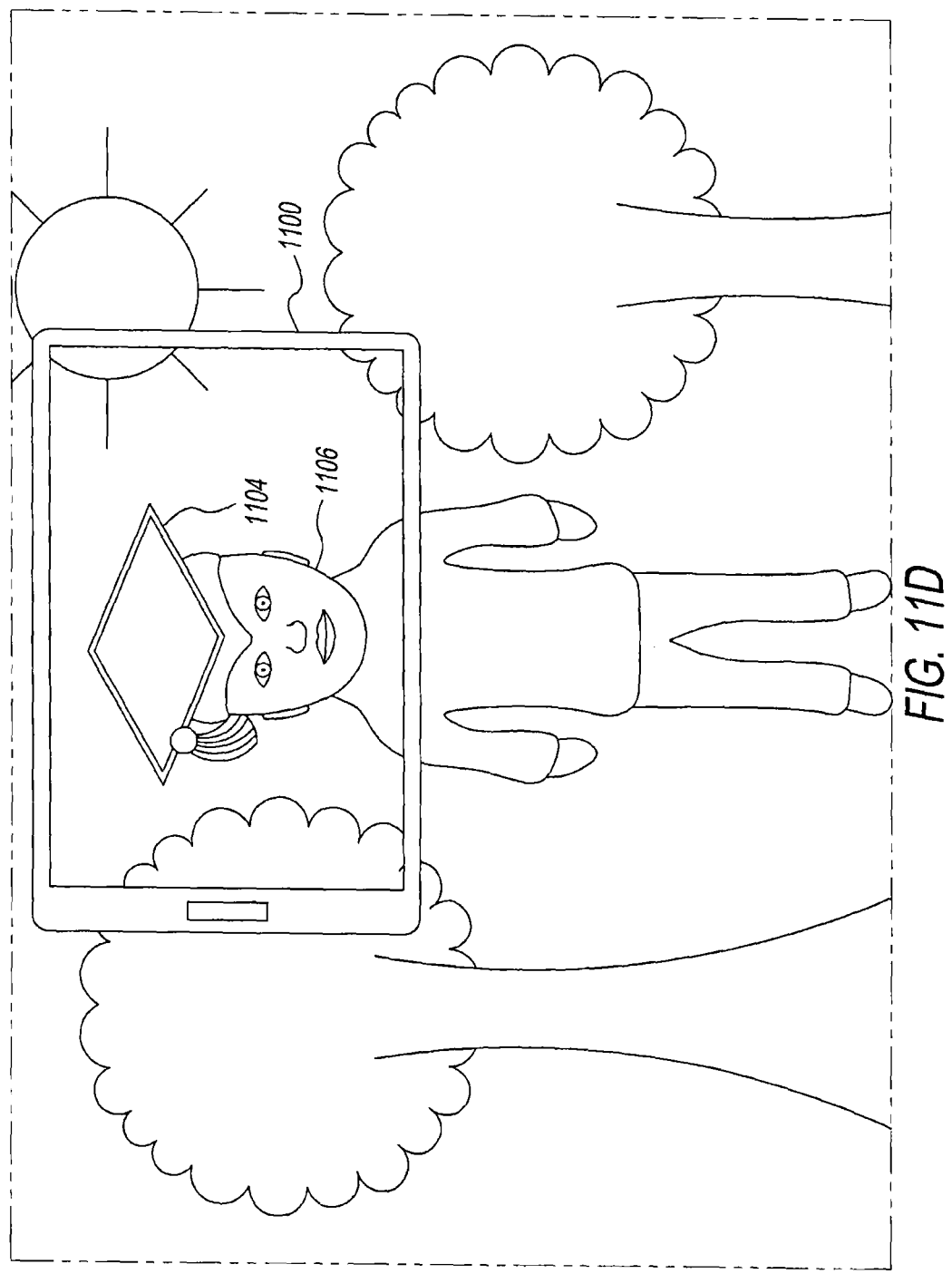

The augmented reality content associated with the graduation cap augmented reality marker 1008 includes a virtual 3D graduation cap 1104, as shown in FIG. 11C, that is overlaid on an image of the user from the camera of the mobile device 1100. When the augmented reality content is first accessed, graphics, such as the silhouette of a face, will appear on-screen indicating that the user should align his or her face with the graphics. Once the app recognizes the user's face, the virtual 3D graduation cap 1104 will appear on the screen as being worn by the user 1106, as shown in FIG. 11D, tracking to the user's movements. Thus, the image of the user on the screen of the mobile device 1100 will appear as if the user is wearing the graduation cap, whereas the user is not wearing a graduation cap in reality. If the user moves his or her head, then the virtual graduation cap will appear to move with the user in the image of the user on the screen. Additionally, virtual 3D balloons float past the user on the screen and confetti rains down. The user can share images taken with the virtual 3D graduation cap, balloons, and confetti on social media sites. The user can repeat the experience with the augmented reality content as long as they keep the downloaded app and the augmented reality marker for activation of the content on the app.

The back of the outer surface of the body 1004 of the pic 1000 can include additional text, such as one or more web addresses where the user can download the app. This provides the user with an alternative from the QR codes 1006 to access the app associated with the pic 1000. In an alternative embodiment, the one or more web addresses can be listed on an inside surface of the body 1004.

Figure 10D:
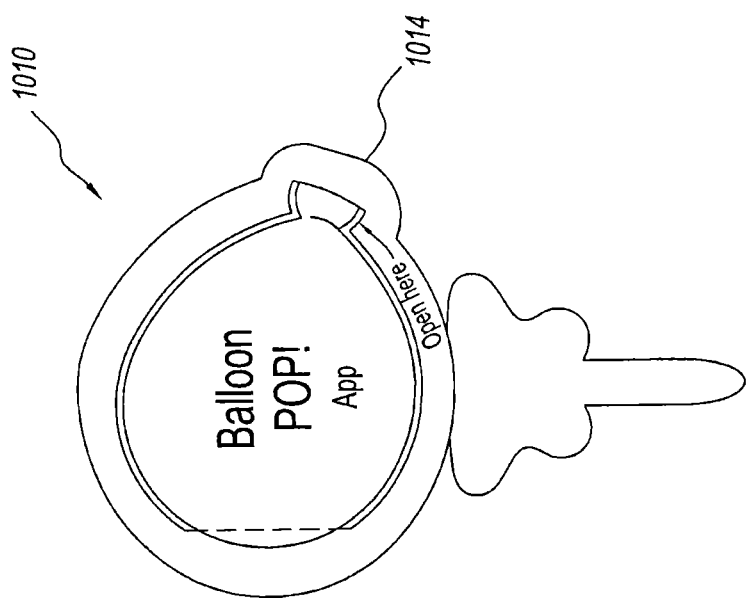
Figure 10F:
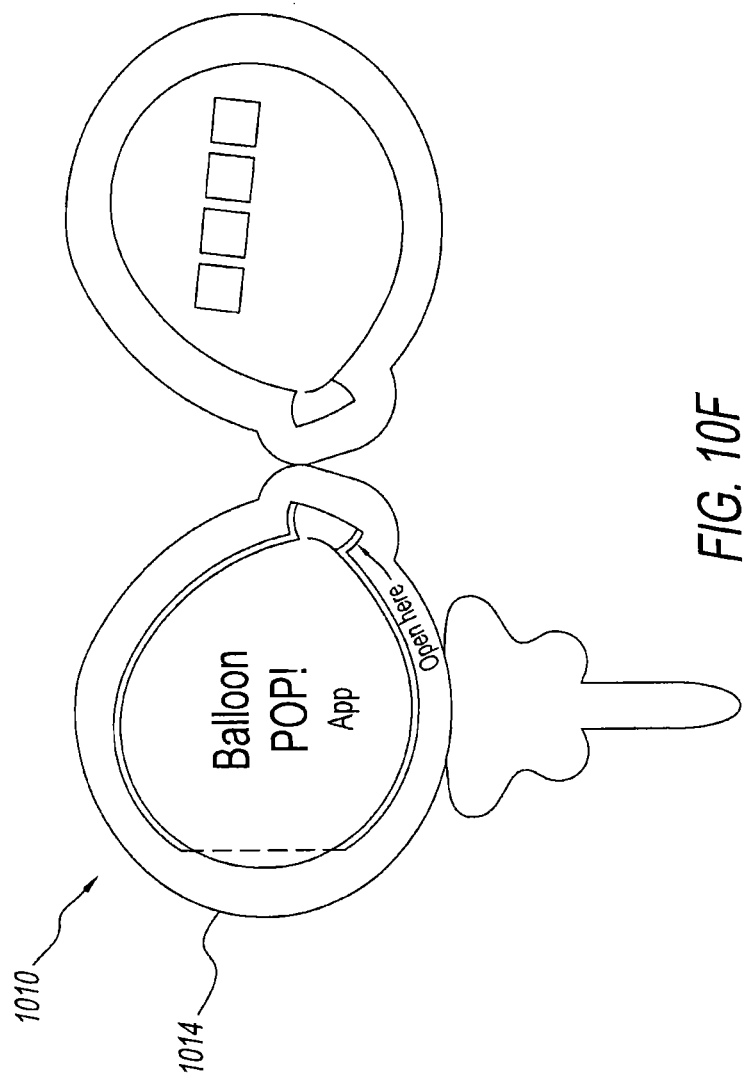
Figure 11E:
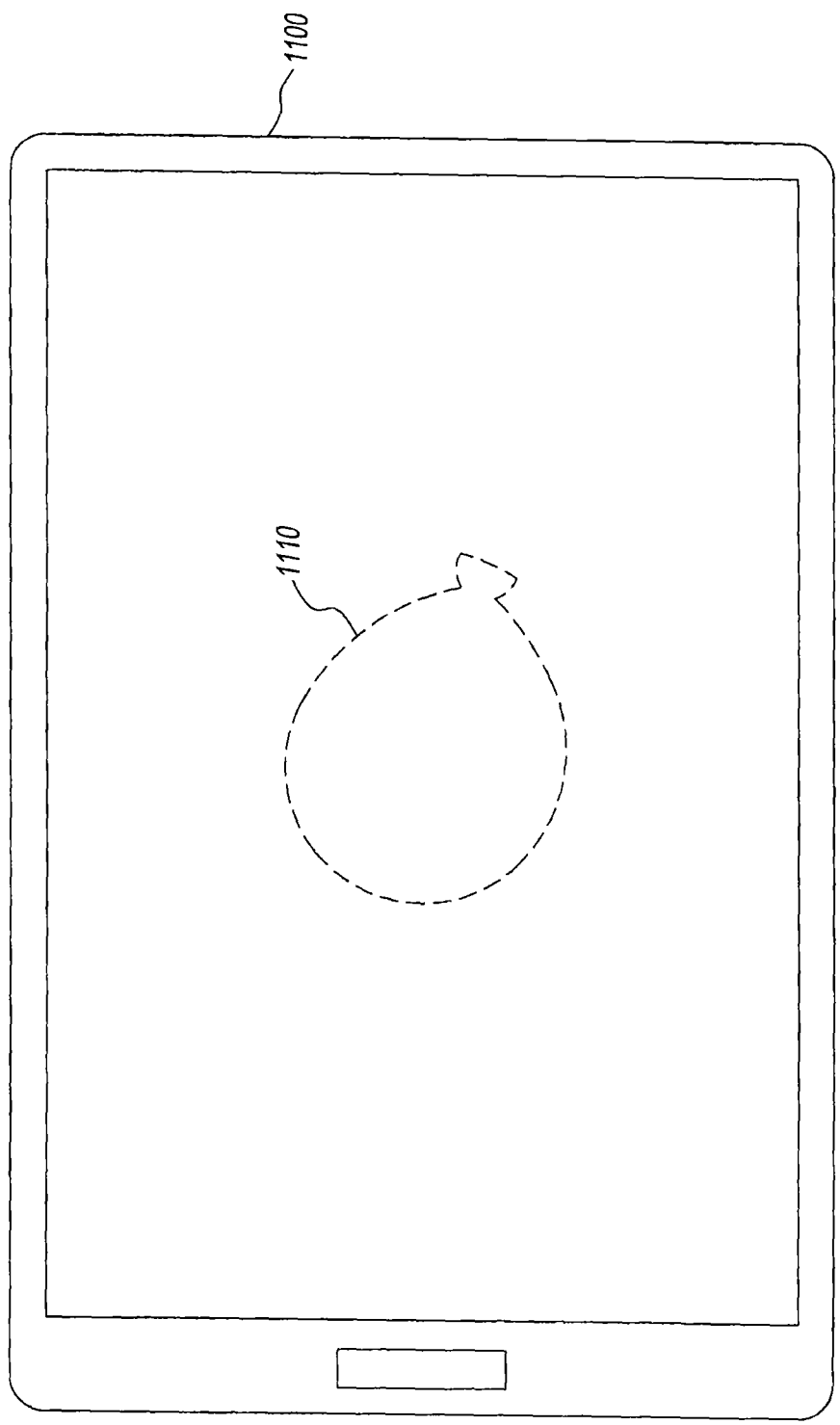
Figure 11G:
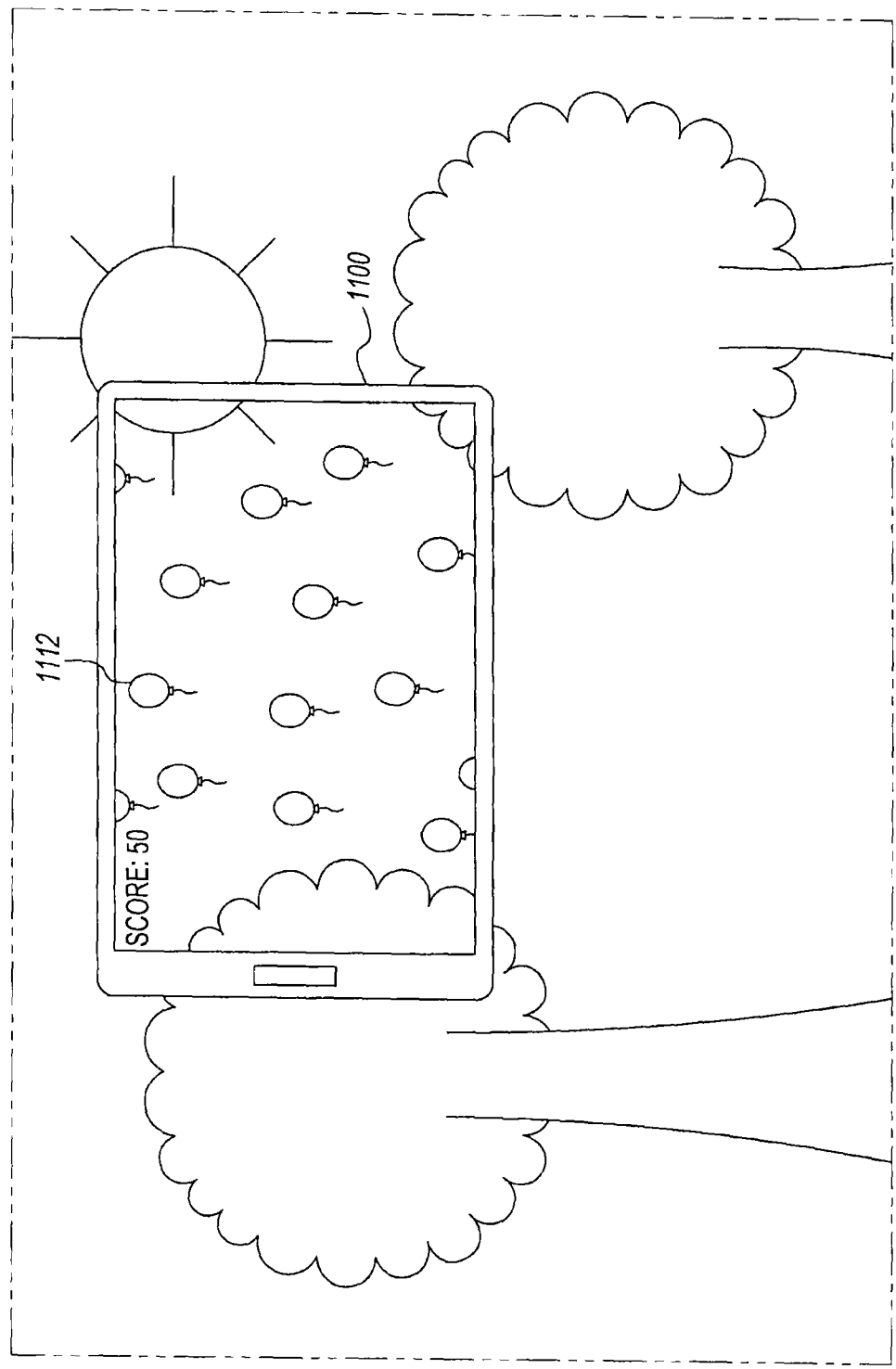

The pic 1010 shown in FIG. 10D includes a body 1014 in the shape of a balloon. This pic 1010 has a similar overall arrangement to the pic 1000 discussed above, with the body 1014 being openable and having a decorative image on the outside surface and QR codes 1016 and an augmented reality marker 1018 on an inside surfaces. The augmented reality marker 1018 for this pic 1010 is in the shape of a balloon. When the Balloon Pop! App associated with this pic 1010 is launched, a silhouette 1110 will appear on the screen of the user's mobile device 1100, as shown in FIG. 11E. The user will then align the silhouette 1110 with the augmented reality marker 1018 on the pic 1010 such that the augmented reality marker 1018 is detected with the user's mobile device, as shown in FIG. 11F, the augmented reality content displayed for the user is a video game in which 3D balloons 1112 are overlaid on the image from the camera of the mobile device, as shown in FIG. 11G. Thus, the 3D balloons appear to be falling in the portion of the user's environment that is viewed through the screen and the user is tasked to tap-to-pop as many as they can within the allotted time. For example, if the user aims their mobile device 1100 such that the camera is viewing trees, virtual balloons will appear on the screen of the mobile device 1100 to be floating down in front of the trees, even though no balloons are floating in front of the trees in reality. Certain balloons that the user pops on the screen can add points to the user's point total while other balloons can subtract from this total. At the completion of the game, the user can share their score via social media.

In the embodiments described above, each augmented reality marker is associated with a separate mobile device app. Alternatively, each augmented reality marker can be associated with the same app, but allow access to different augmented reality content within the app. For example, if a user receives a cake with two different pics containing augmented reality markers, such as the graduation cap and balloon discussed above, the user can scan the QR code from one of the pics to download an app. Once this app is launched on the user's mobile device, the user can scan either augmented reality marker to access the content associated therewith. Thus, two or more unique augmented reality markers can be recognized by the same app to allow access to the augmented reality content associated with the respective augmented reality marker.

Figure 13:
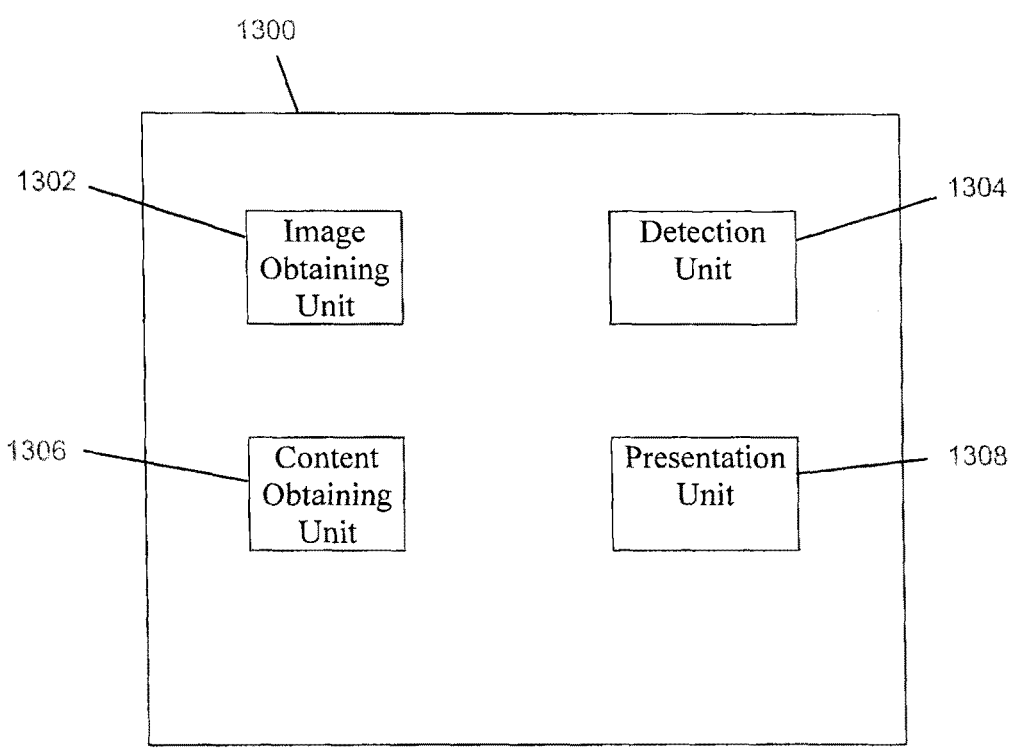
FIG. 13 is a block diagram of an exemplary augmented reality application.

As shown in FIG. 13, an exemplary augmented reality application 1300, such as the application or applications discussed above, includes an image obtaining unit 1302 implemented by the processing circuitry of the mobile device and configured to obtain images from the camera of the mobile device, a detection unit 1304 implemented by the processing circuitry and configured to detect an augmented reality marker embedded on a food product decoration from an obtained image, a content obtaining unit 1306 implemented by the processing circuitry and configured to obtain augmented reality content corresponding to the detected augmented reality marker, and a presentation unit 1308 implemented by the processing circuitry and configured to overlay the obtained augmented reality content onto an obtained image creating a combined image, and to display the combined image on the display screen.

The pics described above include an augmented reality marker on a flat, two-dimensional target. In an alternative embodiment, the augmented reality marker can be a three-dimensional target embedded in a cake decoration, such as a licensed character, sports equipment, balloons, flowers, etc. Similar to the two-dimensional augmented reality markers discussed above, the three-dimensional augmented reality marker could be a unique combination of the shape, color, and/or contrast of the cake decoration when a two-dimensional image is taken of the three-dimensional cake decoration from a predetermined perspective. The cake decoration could come with instructions to the user to scan the cake decoration from a certain perspective and distance. Alternatively, the silhouette that appears on the mobile device could be shaped such that the user would recognize that the cake decoration must be scanned from a predetermined perspective and distance to match the shape of the silhouette. For example, a cake decoration in the shape of a figurine holding a sword at a certain angle would only match the shape of the silhouette on the mobile device if the cake decoration is scanned from a predetermined perspective and distance.

Figure 12:
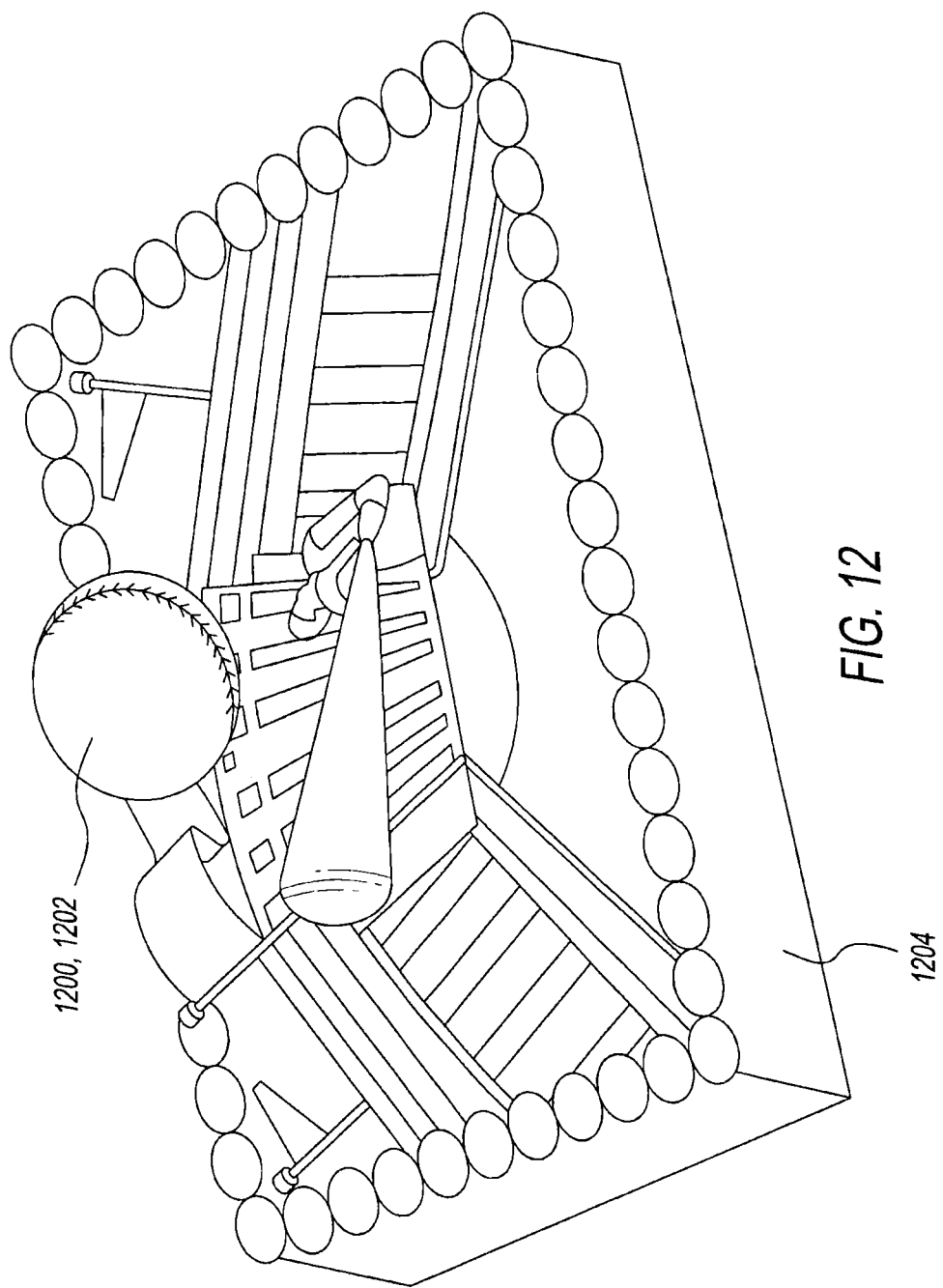
FIG. 12 is an example of non-edible media with a 3D augmented reality marker.

In the exemplary embodiment shown in FIG. 12, the augmented reality marker 1200 is embedded in the baseball decoration 1202 on the cake 1204. In this example, although the baseball decoration 1202 is a three-dimensional figure, the augmented reality marker 1200 is recognized when the user's mobile device recognizes the unique two-dimensional image of the baseball decoration 1202 from a certain angle and certain distance such that the round outline of the baseball and the pattern of the seams of the baseball match a broken-lined silhouette on the user's phone. Once detected with the user's mobile device, the associated augmented reality content is displayed on the mobile device.

Figure 7:
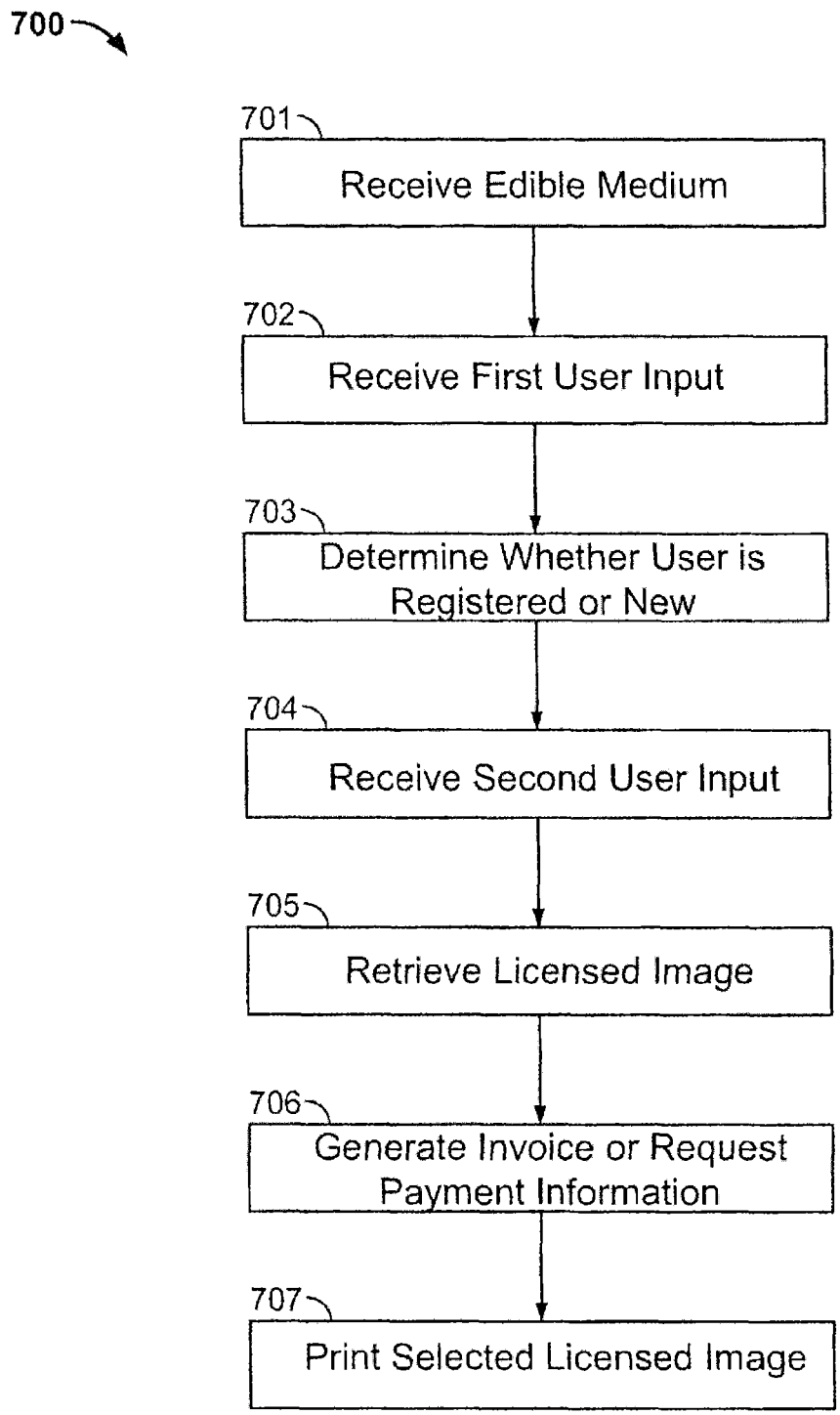
FIG. 7 is a flow diagram of a process for decorating edible media with licensed digital images.

FIG. 7 is a flow diagram of a process 700 for decorating edible media with licensed digital images. The process 700 can be performed by system 100, for example, in the online environment in system 100.

The system 100 receives an edible medium at a printing system connected to the Internet (701). The edible medium may be selected by the user and placed within the system 100, for example.

The system 100 receives a first user input identifying a user of the system (702). For example, a user logs into the system using a username and password. The system 100 determines whether the user is a registered user or a new user (703).

The system 100 receives a second user input selecting at least one licensed image (704). For example, a user enters a request to select a copyrighted cartoon character for printing on a cake top. In some embodiments, the system 100 can limit the available licensed images shown to the user according to the user's geographic location. The system 100 retrieves the at least one licensed image from an Internet repository (705). Upon retrieving the licensed image of the copyrighted cartoon character, the system 100 generates an invoice for the user if the user is a registered user. If the user is an unregistered user or a new user, the system 100 requests payment information to ensure the licensed image is purchased before printing occurs (706). Upon verifying payment, the system 100 prints the selected licensed image onto the selected edible medium. In some embodiments, the system 100 enables the user to digitally edit the selected image prior to printing the selected image onto the edible medium.

Figure 14:
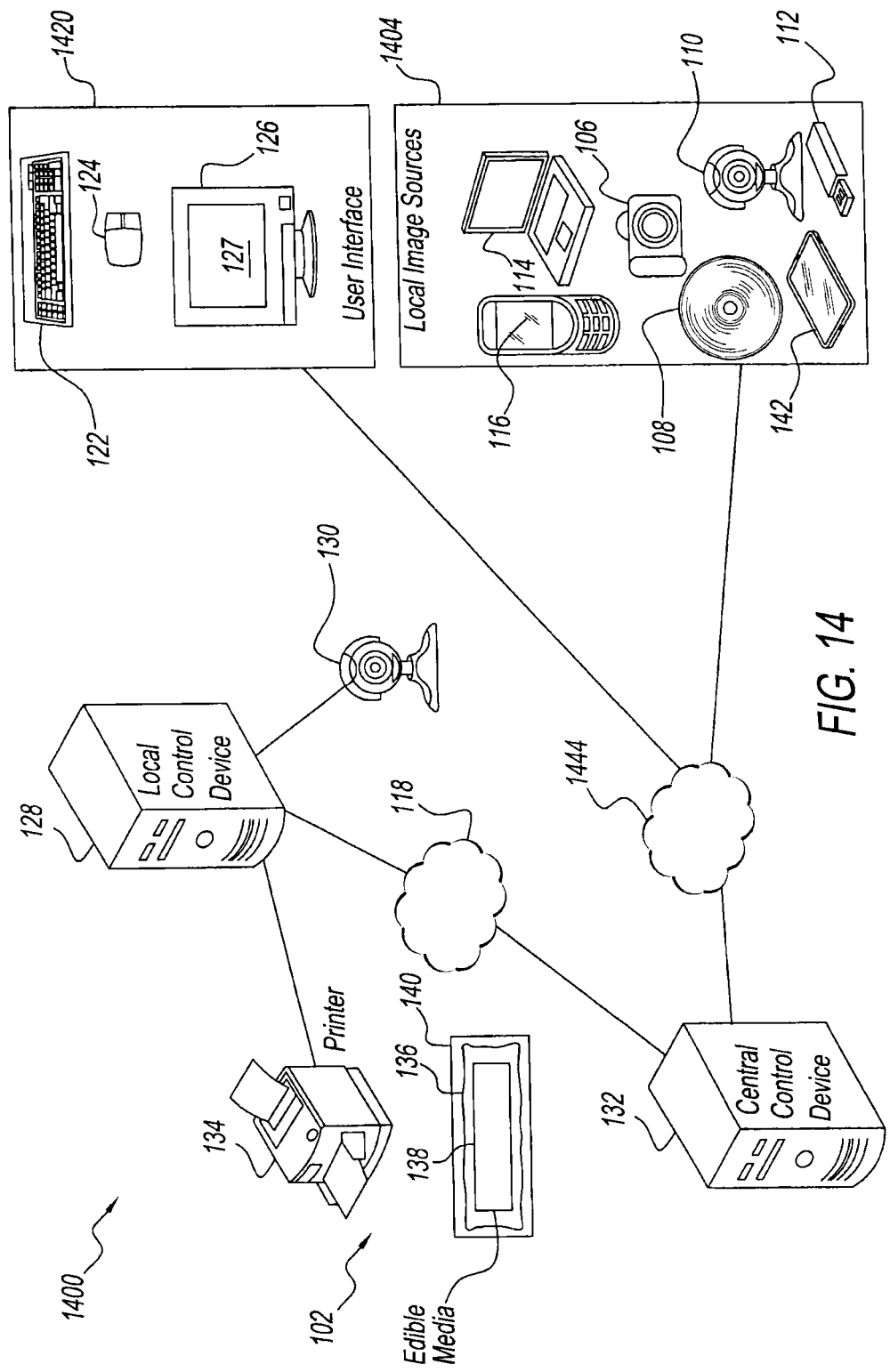
FIG. 14 is another example system for decorating edible media.

FIG. 14 is another example system for decorating edible media. The system 1400 shown in FIG. 14 includes certain components in common with the system 100 shown in FIG. 1 and these common components have been given identical reference characters in FIG. 14. The following description will focus on the differences between these systems.

The system 1400 includes a user interface 1420 and local image sources 1404 that communicate with the central control device 132 via network 1444. Example devices for the user interface and local image sources are discussed above. A user of the system 1400 accesses a website on the central control device 132, via the user interface 1420, to gain access to one or more software modules 202-226, which are discussed above with respect to FIG. 2. Alternatively, the user can download one or more of the software modules 202-226 to a location accessible to the user, such as the device being used as the user interface. Alternatively, the user may install an app on the user interface device to gain access to one or more of the software modules 202-226.

The user may access the online environment via the user interface 1420 to search for and obtain a particular image, as discussed above, or the user may retrieve an image from the local image sources 1404. The device being used as the user interface 1420 may also serve as the local image source 1404.

Once the image is selected, the user utilizes the one or more software modules 202-226 to customize the image for decorating an edible media. The customization of the image could include the user inserting one or more augmented reality markers into the image. Exemplary augmented reality markers are discussed above. The user could select an augmented reality marker that is associated with predetermined augmented reality content or the user could upload his or her own augmented reality content to be associated with the augmented reality marker. The finalized image is transmitted via network 118 to the local control device 128 to be printed via printer 134.

The system 1400 allows the user to be a customer who can upload a new image or select an existing image, customize the image, and then place an order for edible media featuring the customized image, without having to visit a bakery or other retail location.

In an alternative embodiment, the system 100 and the system 1400 can be combined such that the user has the option of using the user interface 120 connected to the local control device 128 or the user interface 1420 that communicates with the central control device 132 via network 1444.

In an alternative embodiment, a printing device such as printing device 134, which is operable to receive and print images upon edible media 102 using edible inks, is sold, leased or provided free of charge to a user for use in-home or in another location independent of a bakery or other retail location. The printing device 134 is provided with one or more of the software modules 202-226 or a license to access one or more of the software modules 202-226. Thus, the local control device 128 can be the user's home computer, smart phone, tablet, or other device described above. The user can upload images via a local image source or can access images through the central control device 132 via network 118. This home-use system allows a consumer to create his or her own edible media at home, without having to outsource the printing to a bakery or other outside producer.

In another embodiment, the system can be used in a bakery environment as a stand-alone system or used in a network, such as a LAN, WAN, MAN, Intranet or even an Internet system. For instance, a controller device, such as user interface 120, with the image sources can be set up on a kiosk, either as a moveable freestanding unit or mounted securely to a counter or other solid fixture. A user can input their own image from a local image source or select their desired image accessed via the controller device, choose the correct settings and activate the system to order the edible media with the image applied thereto. Once the image is scanned or retrieved, the user may leave. The controller device processes the information and transmits the information to a remote site, such as a central controller device such as local control device 128 located, for example, at a central bakery or another location independent from the location where the user orders the edible media. The central bakery or independent location receives the information, processes the order, and then prints the edible media. The finished media is either applied onto a product for direct on-site sale to the user or the product (with finished media) may be shipped to the user, or else shipped by itself to the user.

Another variation includes an Internet web site where the user can either upload their image or select from an image library. The user would then also make the other selections relative to the media size, copies and the like. This information would then be transmitted to the printer, which could be at any location, and then the printed media shipped to the user. The user may then apply the printed media to the food substance of their choosing, such as cake, cupcakes, cookies, of other edible food item. In this embodiment, the printing location may be located in a bakery or in another independent location. The printed media is packaged and shipped to the user via any common delivery service (USPS, UPS, FedEx, et al). The user may then use the printed media howsoever they desire.

As noted above, another variation includes an app on a device (for example, a smartphone, tablet, or PC) of a user with which a user is able to design and order a printed edible media for an edible food item, such as a cake. As noted above, the user can gain access to one or more of the software modules 202-226 using this app. In this embodiment, the user launches the app on the device. Once launched, the user may be presented with different types of edible media that he or she may order. Once the user selects an edible media, the device transmits the information to a location where the edible media will be printed (for example, a bakery, or a non-bakery print shop). Note that, in one embodiment, the user may be presented with different types of cakes that he or she may order if the location is a bakery.

The aforementioned transmission may be performed via e-mail, text message, or any other type of messaging using the app. The device at the printing location accepts the order and transmits a message to the device of the user indicating that the order has been accepted. The message also requests the user to upload an image to be printed by the printing location on the selected edible media.

Accordingly, using the app on the device, the user captures and then uploads an image or selects a pre-stored image that he or she wishes to have printed on the edible media. Using the app, the user is able to design/customize the image as he or she sees fit and to designate where the image should be placed on the edible media. As discussed above, the user may choose to crop, resize, edit, or perform any other type of image processing on the image using, for example, the software modules 202-226. In addition, the user may choose to include text either superimposed on the image, adjacent to the image, or somewhere else on the edible media (or a combination of the aforementioned). Again, the user may customize the text as he or she sees fit.

Once the user has performed the above, the app may generate a print preview of the image and text on the selected edible media. With such function, the user can visualize the final product before printing on the edible media. Once the user is satisfied with the design, the user's device may send a message to the device of the printing location to print the image/text on the selected edible media. Along with this message, the device of the user may also send a file that includes the designed image/text to the device of the printing location. This file is a modifiable file that can be modified by the device at the printing location. For example, if it is determined that there is a misspelling in the text, the device at the printing location may modify the file to correct the misspelling and send a message back to the device of the user notifying the change.

After the file has been reviewed at the printing location, the device at the printing location controls a printer to print the image/text on the edible media. If the user has also ordered an edible food item (for example, a cake), the printed edible media is placed on the cake selected by the user and shipped to the user. Alternatively, the printed edible media can be shipped to the user without a cake.

With the above-discussed embodiment, the functions available at the bakery of designing and customizing an edible media or a cake may now be extended to the user at home or any other location. Using the aforementioned app, the user is able to customize and order a printed edible media from any location, without having to visit the bakery.

Another variation includes an app on a device (for example, a smartphone, tablet, or PC) of a user with which a user is able to design and print (at home using his or her printer) a printed edible media for an edible food item. As noted above, the user can gain access to one or more of the software modules 202-226 using this app. In this embodiment, the user launches the app on the device. Once launched, the user may be presented with different types of edible media that he or she may use.

Using the app on the device, the user captures and then uploads an image or selects a pre-stored image that he or she wishes to have printed on the edible media. Using the app, the user is able to design/customize the image as he or she sees fit and to designate where the image should be placed on the edible media. As discussed above, the user may choose to crop, resize, edit, or perform any other type of image processing on the image using, for example, the software modules 202-226. In addition, the user may choose to include text either superimposed on the image, adjacent to the image, or somewhere else on the edible media (or a combination of the aforementioned). Again, the user may customize the text as he or she sees fit.

Once the user has performed the above, the app may generate a print preview of the image and text on the selected edible media. With such function, the user can visualize the final product before printing on the edible media. The app may also have a built-in spell-check that can notify the user if he or she has misspelled any of the text that is to be included on the edible media. Once the user is satisfied with the design/text, the user's device may send a request to the user's printer to print the image/text on the selected edible media.

With the above-discussed embodiment, the functions available at the bakery of designing and customizing an edible media or a cake may now be extended to the user at home or any other location. Using the aforementioned app, the user is able to customize and print, using his or her own printer, a printed edible media from any location, without having to visit the bakery.

Note that the above-discussed locations may be in different geographical areas (for example, in a different zip code, city, state, or even country).

In one embodiment, a user may capture an image using a local image source or select a pre-stored image that he or she would like to have applied to an edible food item (a cake, a cupcake, or the like). The user, however, may wish to apply this image to a cake that either he or she will make or a cake from a bakery that does not provide the service of printing images on edible products. Note that the image captured by the user may be of anything. For example, the image may be of user's friends/family, artwork of the user's child, an image of the user taken by himself or herself (i.e., a "selfie"), scenery/nature, etc.

Accordingly, the user may wish to send this to a device at another location to have the image printed on edible media and have the edible media sent back to him or her. Such device/location may be associated with a third party independent of a bakery or the user. In one embodiment, the device/location may be in a different geographical location/area (for example, in a different zip code, city, state, or even country) from the user and/or the bakery.

The user may send the image to the device of this third-party using text message (which can contain image, video, and sound content), e-mail, or the like. The user may also upload this image via a website, as has been previously discussed.

Once the device at the third-party location has received the image, the device may send a confirmation message to the user's device to confirm that the image has been received. Such message may be sent to the user's device using the same type of communication (text messaging, email, or the like) used in sending the image.

In one embodiment, before the image is printed on the edible media, the device at the third-party location may perform image processing on the image to ensure it meets the optimum standard for printing on the edible media. For example, the device may determine whether the received image is of sufficient size and resolution to be successfully printed on edible media.

If the device determines that the image is of sufficient size/resolution, the device may next determine whether any type of image processing is needed in order to ensure a good quality print (that is of suitable quality, size, or image density) on the edible media. Based on this determination, the device may perform the appropriate image processing, and then print the image onto the edible media. Note that in such case, there may be no need for the device to inform the user of the particular image processing that has been performed.

If the device determines, for example, that the image is not of sufficient size, the device may attempt to adjust the size of the image. If the device determines that the image cannot be successfully printed on edible media, the device may send a message to the user informing him or her of the situation and/or requesting a new image be sent.

Once the image has been printed on the edible media, the device, in one embodiment, may send a request to another device to prepare the final product for shipment. In one embodiment, the device may print a shipping label to prepare the final product to be shipped to the user. In one embodiment, the device may inform the user that the final product is ready for shipment or provide other type of updates associated with the process.

Note that if the user selects a pre-stored image that was not captured by the user, but rather by someone else (for example, a professional photographer), there may be a copyright issue with respect to the device printing such image on the edible media. In such case, the user may send, along with the image, a document or note from the photographer/copyright owner granting the rights to print such image. Additionally or alternatively, the device may perform a determination after first receiving an image (but before performing the determination whether the image is of suitable quality, size, or image density to be printed) whether the image may be copyrighted. In some embodiments, the system may send the user a notification or warning of copyright limitations and require the user to acknowledge understanding of copyright limitations and/or require verification of ownership of the copyright by the user prior to proceeding to the completion of the printing process.

Such determination may be performed by checking the image for any type of embedded text/marking (for example, a watermark). If the device determines that the image is (or appears to be) copyrighted, the device may notify the user to submit a document or note from the photographer/copyright owner or may contact the photographer/copyright owner directly to ask for permission to print such image. The photographer/copyright owner's name/information may be embedded in the text/marking on the image. From this information, the device may perform a search (for example, an Internet search) for the contact information. If such permission from the photographer/copyright owner is not received, the device may not print the image and thus send a message to the user notifying the user that the image will not be printed due to a copyright issue.

Further to the aforementioned discussion, a user may send a plurality of images to the device for printing on the edible media. The user may or may not send instructions on how he or she would like these images printed on the edible media. If the user sends instructions, the device may then print the image in accordance with the instructions. However, if the user sends no instructions, the device may perform a determination to determine the best (and most aesthetically pleasing) layout for printing the images.

For example, the device may determine the best layout for the images is to print them side by side, or to have the images superimposed (to some degree), or to create some type of artwork/collage using the images. The device may also use predefined templates and determine which of the templates is best suited for the particular images to be printed. Such determination may be carried out based on certain factors such as the number of images, the type of images (images of nature may be treated differently than images of people), the subject matter of the images (for example, if the images are images depicting Christmas, the device may determine to use a Christmas-themed template such as printing the images in the form of a Christmas tree, etc.), the size/resolution of the images, or the like.

Furthermore, note that the above-discussed image processing/manipulations may be performed automatically by the device (without human/operator input) or may be performed by a combination of the device and input of the operator of the device. If, during the above-discussed processes, the image submitted by the user is deemed unworthy (for example, due to size, quality, image density, explicit material, etc.), the device may notify the operator of the device of the unsatisfactory condition (for example, by displaying a message/graphic on a display). Additionally or alternatively, the device may automatically notify the user that has submitted the image of the condition of the image and the reason the image has been deemed unworthy for printing on the edible media. With such feature, the user (as well as the operator) may be kept up-to-date/informed throughout the various stages of the printing process.

Each of the functions of the described embodiments may be implemented by one or more processing circuits. A processing circuit includes a programmed processor (for example, processor 810 in FIG. 8), as a processor includes circuitry. A processing circuit also includes devices such as an application specific integrated circuit (ASIC) and conventional circuit components arranged to perform the recited functions.

Figure 8:
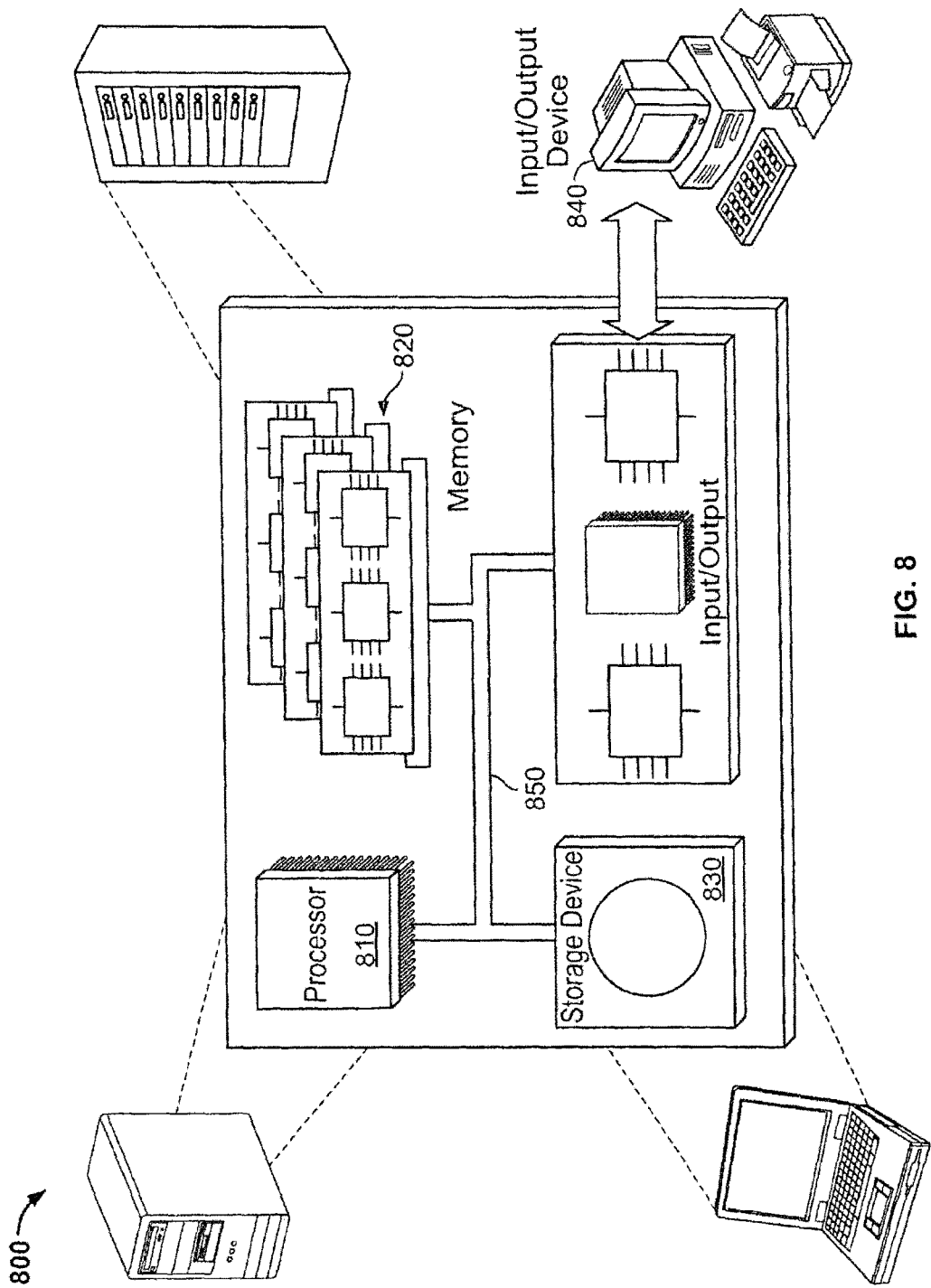
FIG. 8 is a block diagram of an example computer system.

FIG. 8 is a schematic diagram of a computer system 800. Each of the devices discussed above (for example, the local control device 128/interface 120, the central control device 132, the device of the third party, the mobile device, laptop, netbook, and the like) may include the features/hardware of the system 800. The system 800 is optionally used for the operations described in association with any of the computer-implement methods described previously, according to one implementation. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 is optionally a floppy disk device, a hard disk device, an optical disk device, a flash drive device, or a tape device.

The input/output device 840 provides input/output operations for the system 800. In one implementation, the input/output device 840 includes a keyboard and/or pointing device. In another implementation, the input/output device 840 includes a display device for displaying graphical user interfaces.

In some examples, the features described are implemented in digital electronic circuitry, or in computer hardware, firmware, software, or in combinations of them. The apparatus is optionally implemented in a computer program product tangibly embodied in an information carrier, e.g., in a machine-readable/computer-readable storage device/medium, for execution by a programmable processor; and method steps are performed by a programmable processor executing a program of instructions to perform functions of the described implementations by operating on input data and generating output. The described features are optionally implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that are optionally used, directly or indirectly, in a computer to perform a certain activity or bring about a certain result. A computer program is optionally written in any form of programming language, including compiled or interpreted languages, and it is deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD ROM disks. The processor and the memory are optionally supplemented by, or incorporated in, ASICs (application-specific integrated circuits).

To provide for interaction with a user, the features in some instances are implemented on a computer having a display device such as a CRT (cathode ray tube) or LCD (liquid crystal display) monitor for displaying information to the user and a keyboard and a pointing device such as a mouse or a trackball by which the user provides input to the computer.

The features are optionally implemented in a computer system that includes a back-end component, such as a data server, or that includes a middleware component, such as an application server or an Internet server, or that includes a front end component, such as a client computer having a graphical user interface or an Internet browser, or any combination of them. The components of the system are connected by any form or medium of digital data communication such as a communication network. Examples of communication networks include, e.g., a LAN, a WAN, and the computers and networks forming the Internet.

The computer system optionally includes clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications are optionally made without departing from the spirit and scope of this disclosure. Accordingly, other embodiments are within the scope of the following claims.

What is claimed is:

1. A method for integrating augmented reality into service of a customized food product, comprising:
   presenting, by processing circuitry to a user at a remote computing device via a network, a design interface for generating a print design for printing on edible media, the design interface comprising at least one image of a plurality of images, wherein a portion of the plurality of images include embedded augmented reality markers;
   receiving, by the processing circuitry from the remote computing device via the network, indication of a first image of the plurality of images and a type of edible media selected by a user through the design interface, wherein the first image includes one or more embedded augmented reality markers;
   receiving, by the processing circuitry from the remote computing device, one or more editing options for customizing the first image selected by the user at the design interface;
   modifying, by the processing circuitry, an image file for the first image according to the one or more editing options to produce a modified image file; and
   providing, to a remote printer by the processing circuitry, print information for printing the modified image file on the type of edible media, wherein the print information comprises color contrast information for the one or more augmented reality markers relative to the first image such that the one or more augmented reality markers are detectable in a video signal of the modified image file printed onto the type of edible media after the video signal is captured by a remote mobile computing device.

2. The method of claim 1, wherein the one or more augmented reality markers comprise one or more asymmetric geometric shapes arranged within the first image.

3. The method of claim 1, wherein each of the augmented reality markers embedded within the portion of the plurality of images is associated with stored augmented reality content associated with a respective augmented reality marker.

4. The method of claim 3, wherein the stored augmented reality content is unique to a respective image associated with the respective augmented reality marker.

5. The method of claim 1, further comprising:
   receiving, by the processing circuitry from the remote mobile computing device, the video signal; and
   detecting, by the processing circuitry, at least one of the one or more augmented reality markers for the first image within the video signal.

6. The method of claim 5, further comprising:
   presenting, by the processing circuitry responsive to detecting at least one of the one or more augmented reality markers for the first image within the video signal, stored augmented reality content customized to the first image within a display of the remote mobile computing device.

7. The method of claim 6, wherein the stored augmented reality content customized to the first image comprises a video file depicting movement of the first image.

8. The method of claim 6, wherein the first image depicts a princess.

9. The method of claim 1, wherein the one or more editing options comprise at least one of cropping, re-touching, brightening, darkening, and adding a text message or frame to a selected image.

10. The method of claim 1, wherein the type of edible media comprises at least one of measurements and shapes of the edible media.

11. A system comprising:
   an image library stored to one or more non-transitory computer-readable storage devices, the image library comprising a plurality of images, wherein
   a portion of the plurality of images includes embedded augmented reality markers;
   processing circuitry; and
   a non-transitory computer readable storage medium having instructions stored thereon, wherein the instructions, when executed by the processing circuitry, cause the processing circuitry to
   present, for review by a user at a remote user computing device, a searchable repository of the plurality of images,
   present, for review by the user at the remote user computing device, a design interface for generating a print design, the design interface comprising a selected image of the plurality of images for printing on a type of edible media, the image and the type of edible media selected by a user through the design interface,
   receive, at the design interface, the print design incorporating the selected image and the type of edible media, wherein the selected image includes one or more embedded augmented reality markers,
   receive, at the design interface, one or more editing options for customizing the selected image, modify, based on user selections received at the design interface, an image file for the selected image according to the one or more editing options to produce a modified image file, and provide, to a remote printer, print information for printing the modified image file on the type of edible media, wherein the print information comprises color contrast information for the one or more augmented reality markers relative to the image file such that the one or more augmented reality markers are detectable in a video signal of the modified image file printed onto the type of edible media after the video signal is captured by a remote mobile computing device.

12. The system of claim 11, wherein the one or more augmented reality markers comprise one or more asymmetric geometric shapes arranged within the image.

13. The system of claim 11, wherein each of the augmented reality markers embedded within the portion of the plurality of images is associated with stored augmented reality content associated with a respective augmented reality marker.

14. The system of claim 13, wherein the stored augmented reality content is unique to a respective image of the plurality of images associated with the respective augmented reality marker.

15. The system of claim 11, wherein the instructions, when executed by the processing circuitry, further cause the processing circuitry to:

receive, from the remote mobile computing device, the video signal; and detect, within the video signal, at least one of the one or more augmented reality markers for the selected image.

16. The system of claim 15, wherein the instructions, when executed by the processing circuitry, further cause the processing circuitry to:

present, responsive to detecting at least one of the one or more augmented reality markers for the selected image within the video signal, stored augmented reality content customized to the selected image within a display of the remote computing mobile device.

17. The system of claim 16, wherein the stored augmented reality content customized to the selected image comprises a video file depicting movement of the selected image.

18. The system of claim 16, wherein the selected image depicts a princess.

19. The system of claim 11, wherein the one or more editing options comprise at least one of cropping, re-touching, brightening, darkening, and adding a text message or frame to the selected image.

20. The system of claim 11, wherein the type of edible media comprises at least one of measurements and shapes of the edible media.

* * * * *